(12) United States Patent
Yamamoto

(10) Patent No.: US 9,225,912 B2
(45) Date of Patent: Dec. 29, 2015

(54) IMAGE CAPTURING APPARATUS

(75) Inventor: Katsuya Yamamoto, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/345,096

(22) PCT Filed: Sep. 12, 2012

(86) PCT No.: PCT/JP2012/073970
§ 371 (c)(1),
(2), (4) Date: Mar. 14, 2014

(87) PCT Pub. No.: WO2013/039256
PCT Pub. Date: Mar. 21, 2013

(65) Prior Publication Data
US 2014/0347519 A1    Nov. 27, 2014

(30) Foreign Application Priority Data
Sep. 14, 2011   (JP) ................. 2011-200828

(51) Int. Cl.
*H04N 5/76*   (2006.01)
*H04N 5/262*   (2006.01)
(Continued)

(52) U.S. Cl.
CPC ........... *H04N 5/2621* (2013.01); *H04N 1/2125* (2013.01); *H04N 1/2133* (2013.01);
(Continued)

(58) Field of Classification Search
CPC . H04N 5/2621; H04N 1/2133; H04N 1/2125; H04N 1/2141; H04N 5/915; H04N 5/772; H04N 5/23229; H04N 5/2355; H04N 5/23293; H04N 5/235

USPC ............................. 348/231.99, 552
IPC ............. H04N 5/235,5/2355, 5/23229, 5/2621, H04N 5/23293, 5/915, 5/772
See application file for complete search history.

(56) References Cited

U.S. PATENT DOCUMENTS

| 5,309,243 A | 5/1994 | Tsai |
| 2004/0207734 A1 | 10/2004 | Horiuchi |

(Continued)

FOREIGN PATENT DOCUMENTS

| EP | 2 043 361 A1 | 4/2009 |
| JP | 2005-323411 | 11/2005 |

(Continued)

OTHER PUBLICATIONS

International Search Report Issued Oct. 23, 2012 in PCT/JP12/073970 Filed Sep. 12, 2012.

(Continued)

*Primary Examiner* — Yogesh Aggarwal
(74) *Attorney, Agent, or Firm* — Oblon, McClelland, Maier & Neustadt, L.L.P.

(57) ABSTRACT

An image capturing apparatus includes an interval shooting section (51) that performs an interval shooting process, a lighten compositing section (54) that performs a lighten compositing process using images captured one by one by the interval shooting process, and a composite-image-in-progress displaying section (55) that, when a first operation is performed, causes a composite image in a first memory area, which is used as a compositing buffer for the lighten compositing process, to be displayed on an LCD monitor without causing the interval shooting process to be stopped.

10 Claims, 15 Drawing Sheets

(51) Int. Cl.
*H04N 5/235* (2006.01)
*H04N 5/232* (2006.01)
*H04N 5/77* (2006.01)
*H04N 5/915* (2006.01)
*H04N 1/21* (2006.01)

(52) U.S. Cl.
CPC ............ *H04N1/2141* (2013.01); *H04N 5/235* (2013.01); *H04N 5/2355* (2013.01); *H04N 5/23229* (2013.01); *H04N 5/23293* (2013.01); *H04N 5/772* (2013.01); *H04N 5/915* (2013.01)

(56) References Cited

U.S. PATENT DOCUMENTS

2006/0098112 A1   5/2006   Kelly
2007/0086674 A1   4/2007   Guan
2008/0186399 A1   8/2008   Okamoto
2011/0050722 A1   3/2011   Muraki et al.

FOREIGN PATENT DOCUMENTS

| JP | 2007-143120 | 6/2007 |
| JP | 2008-193239 | 8/2008 |
| JP | 2009-239600 | 10/2009 |
| JP | 2009239600 A * | 10/2009 |

OTHER PUBLICATIONS

The Extended European Search Report issued Jan. 13, 2015, in Application No. / Patent No. 12831136.2-1902 / 2756664.

* cited by examiner

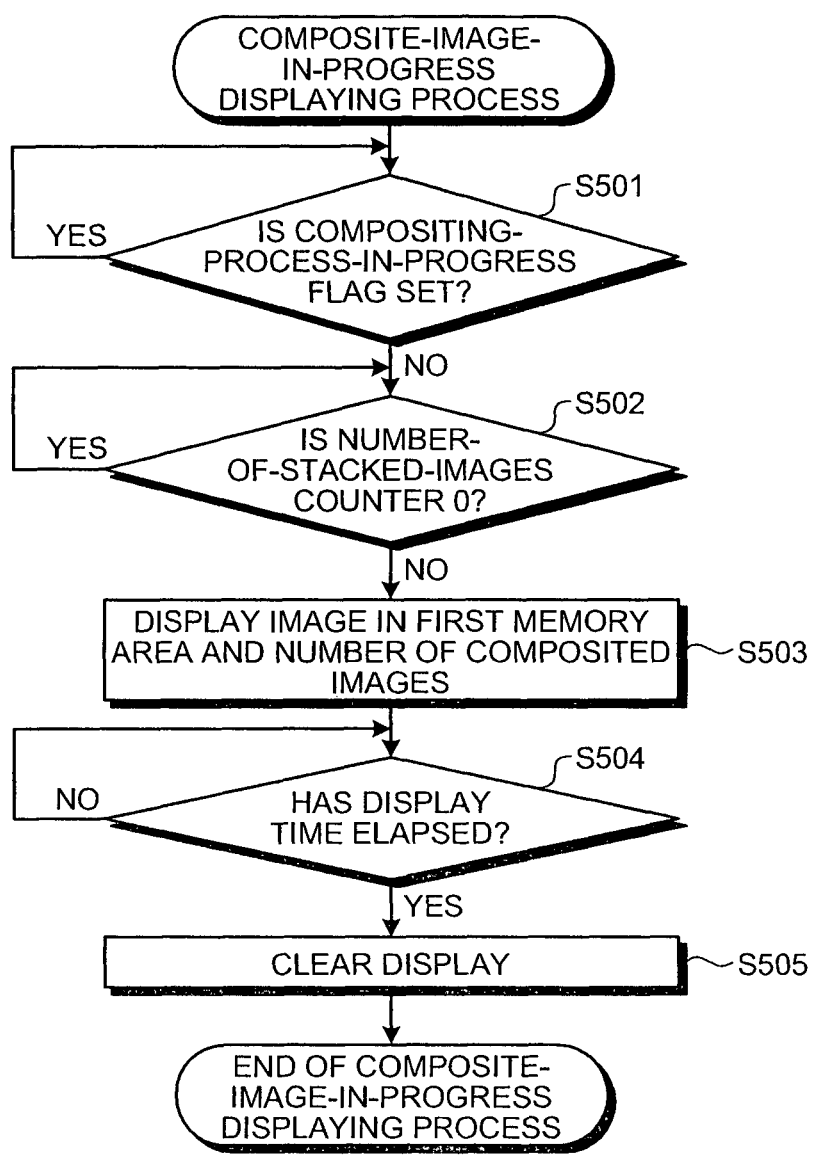

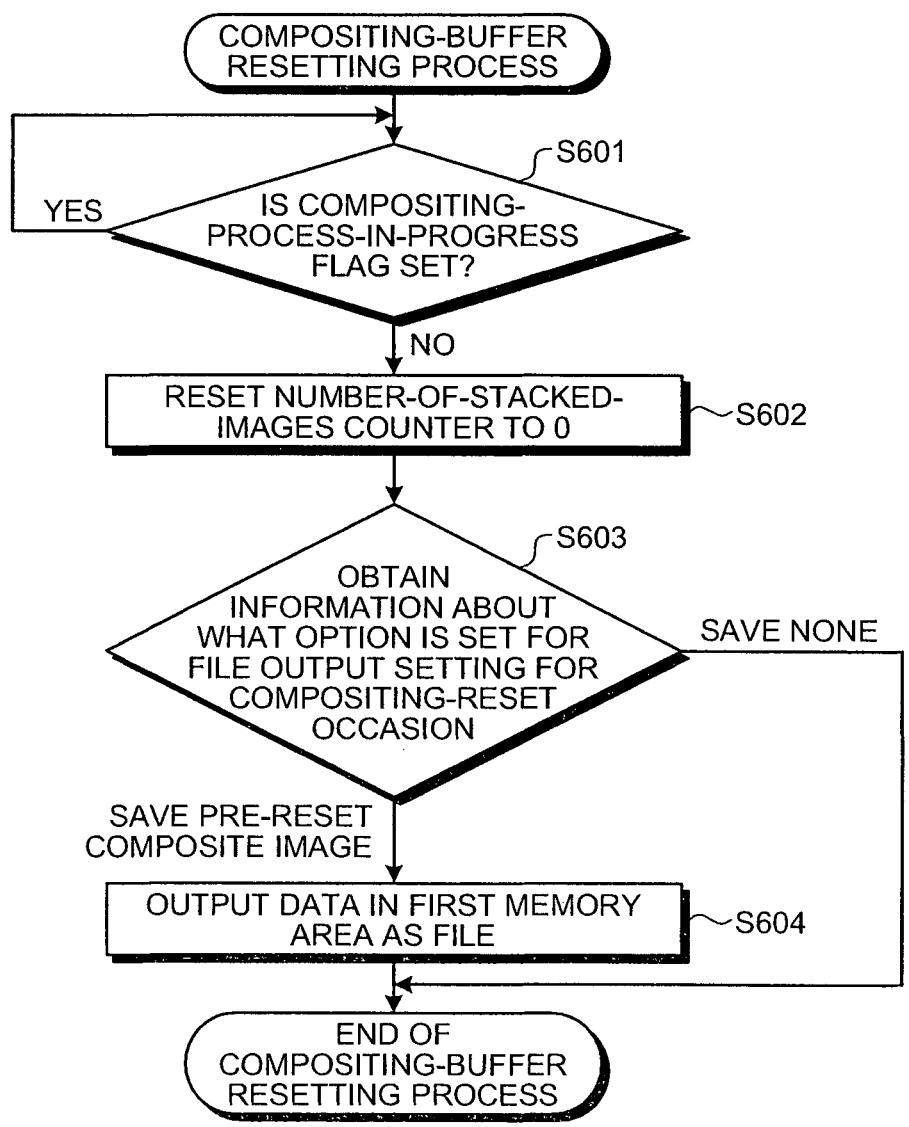

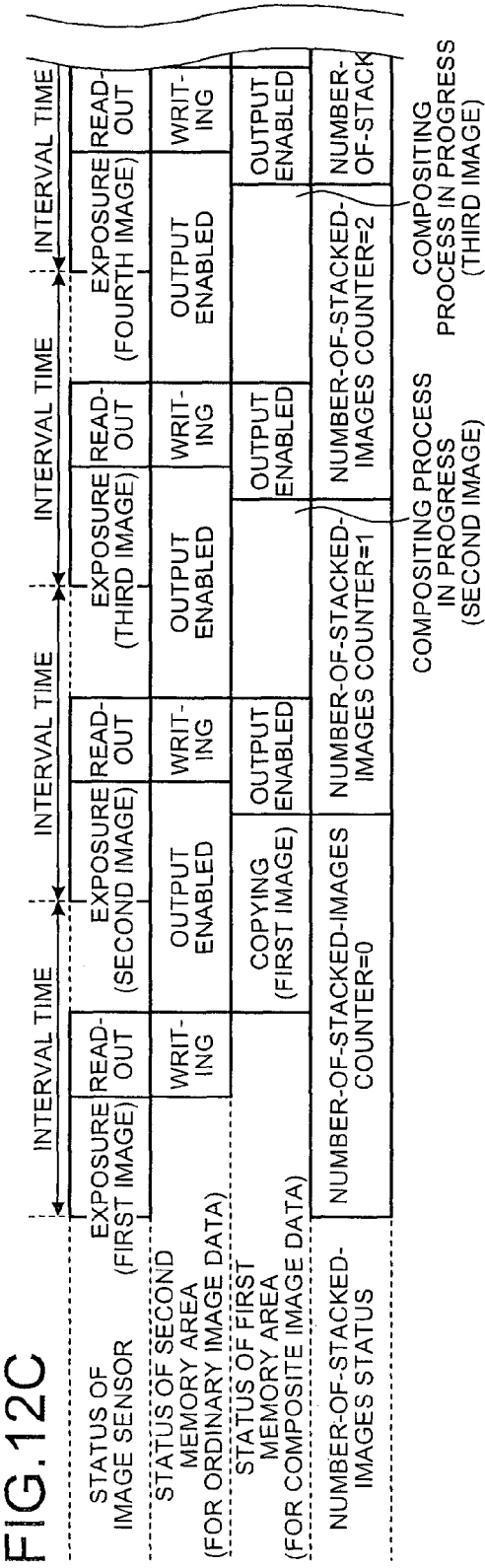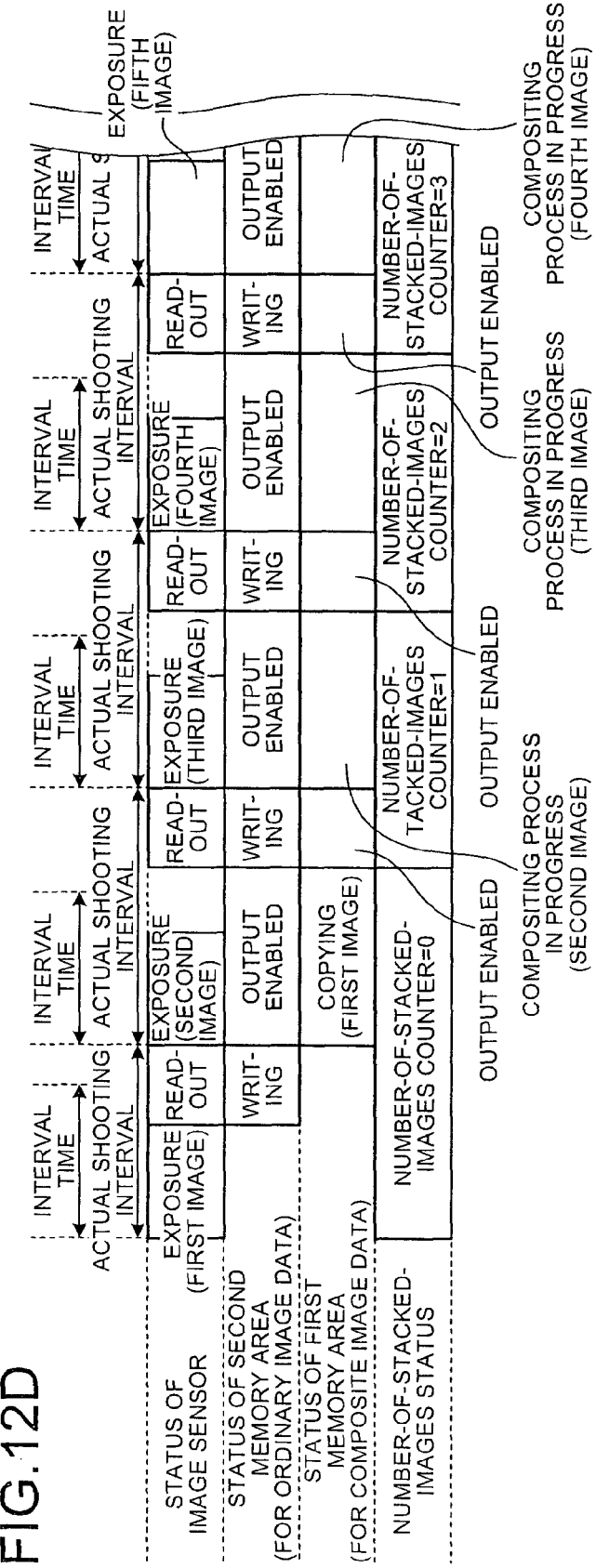

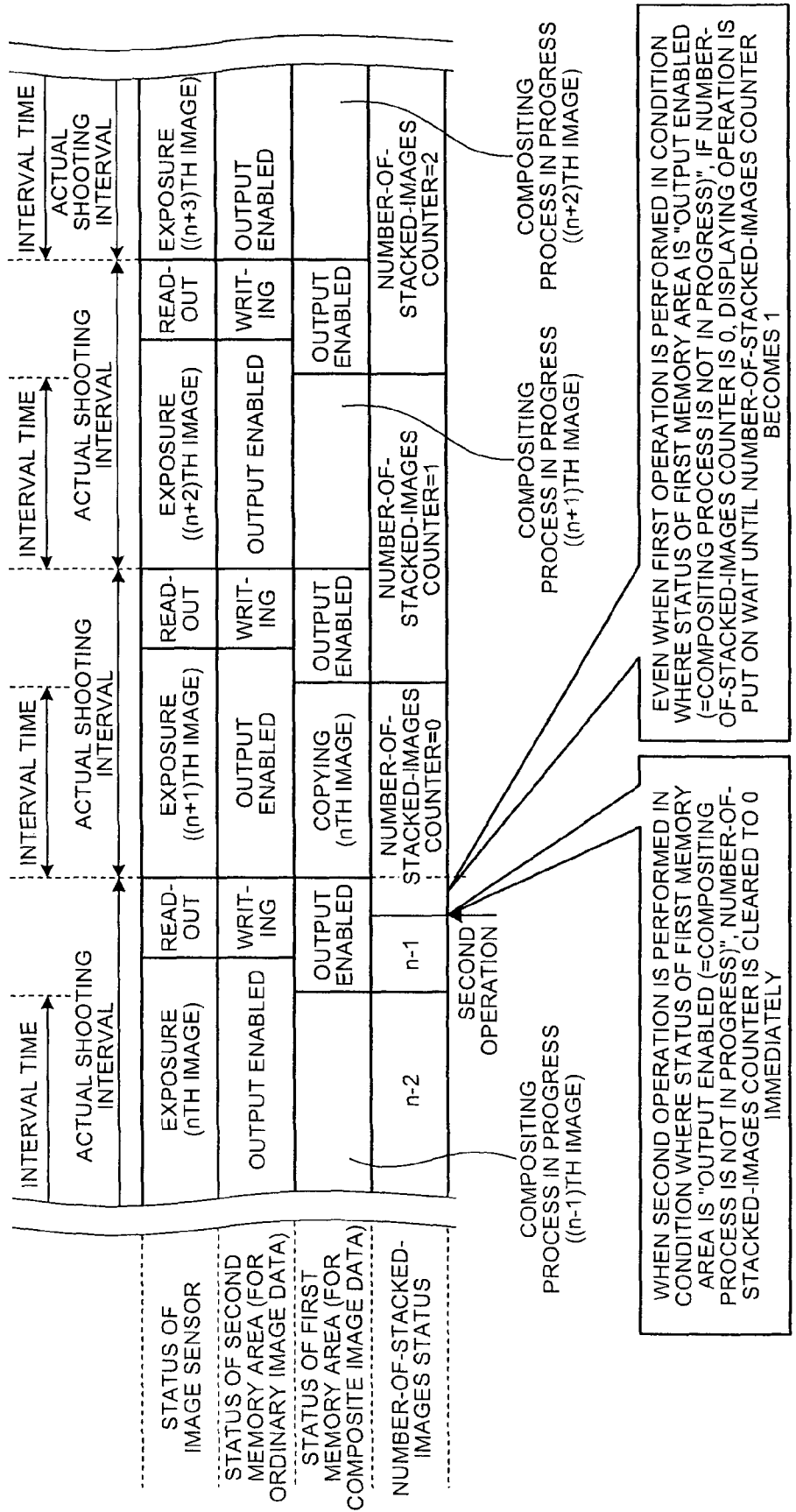

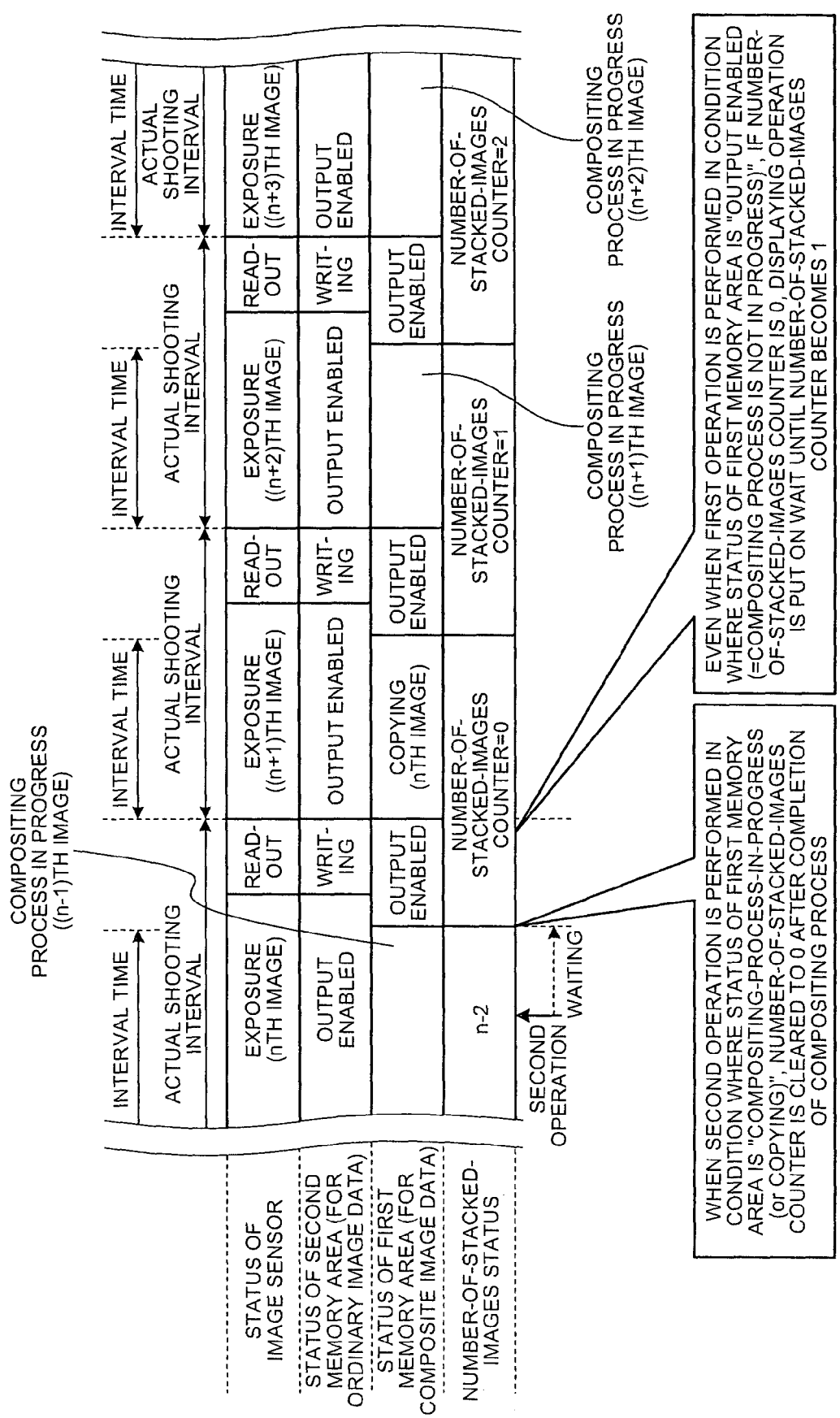

IMAGE CAPTURING APPARATUS

TECHNICAL FIELD

The present invention relates to an image capturing apparatus that captures an image by causing an optical image to be formed on an image sensor.

BACKGROUND ART

In recent years, as digital cameras have become technologically advanced and widespread, digital cameras are used for various shooting purposes, and a number of new picture representation methods that were missing in film-camera days are arising. Included among the methods is a method of producing a new picture utilizing a large number (generally over a few hundred) of still images captured by performing interval shooting with a digital camera secured on a tripod. More specifically, lighten compositing, which is a type of compositing processes, is adopted on some occasions to produce a photo in which the number of trails of fireflies moving inside a picture display is increased or a photo in which trails of stars moving across a night sky due to diurnal motion of the earth are captured.

A lighten compositing process is performed according to the following procedure, for example. First, a first image, which is an image captured first, of a large number of still images to be processed is written to a compositing memory area as an initial value. Luminance comparison is made between a pixel of a second still image, which is an image captured next to the first image, and the same pixel of the first still image written to the compositing memory area, and a brighter one of the pixels is rewritten to the compositing memory area. This operation is performed on every pixel, thereby causing a composite image of the first still image and the second still image to be stored in the compositing memory area. Thereafter, as for each of third and following still images, the operation of making luminance comparison between a pixel of a still image to be processed and the same pixel of a composite image in the compositing memory area and rewriting a brighter one of the pixels to the compositing memory area is performed on every pixel, and this step is repeatedly performed on every still image to be processed.

A composite image that looks as if the image was captured by long exposure is obtained by performing such a lighten compositing process as described above using a large number of still images captured by interval shooting with a digital camera. The lighten compositing process is generally executed by software installed in a personal computer (hereinafter, referred to as a "PC"). More specifically, a photographer generally captures a large number of images by performing interval shooting using a digital camera, transfers the images to the PC, and performs the lighten compositing process using the software on the PC.

Described below are advantages and disadvantages of each of approaches that are long exposure with a conventional film camera, normal long exposure with a digital camera, long exposure by stacking with a digital camera, and a lighten compositing process using a PC. The long exposure by stacking with a digital camera is, for example, long exposure that utilizes the technique described in patent document 1.

(1) Long Exposure with Film Camera
<Advantage>

When long exposure is performed on a low-intensity subject, a formula that doubling exposure duration makes a resultant photo brighter by a degree corresponding to 1 EV does not hold, and a film is less sensitive to light (that is, a film generally has a characteristic called "reciprocity law failure"). Accordingly, long exposure on the order of hours in a dark environment can be performed utilizing this characteristic (however, it should be noted that limitation to 1 to 2 hours is imposed in Japan where night skies are bright, although the limitation depends on an environment, when an ISO 100 film is used). This allows, by shooting a night sky, obtaining a photo in which trails of stars are captured without making a low-intensity portion, which corresponds to background of the stars, too bright.

<Disadvantages>

Experience is required to determine exposure because of reciprocity law failure.

This approach is prone to color cast.

In an environment where subjects that differ largely in luminance are mixed, blown out highlights are undesirably produced in a brighter portion of a photo (therefore, an urban scene with stars trailing as long as 1 hour cannot be captured with this approach).

The longer the light trails, the greater an f-stop number or the lower a sensitivity of a film to be used becomes. Therefore, trails of dark stars (faint stars) are not captured (this is due to a principle generally called as limiting magnitude).

A user cannot view a composite image in progress.

A user cannot view a resultant image immediately after shooting.

(2) Normal Long Exposure with Digital Camera
<Advantages>

Because digital cameras are insusceptible to reciprocity law failure even with a low-intensity subject, doubling exposure duration makes a resultant photo brighter by a degree corresponding to 1 EV.

This approach is suitable for a purpose of shooting photos in which stars are still on a condition that a wide-angle lens is used, exposure time is set to equal to or shorter than 20 seconds, and ISO sensitivity is set to a high sensitivity.

Color correction can be performed easily.

A user can view a resultant image immediately after shooting.

<Disadvantages>

Because digital cameras are insusceptible to reciprocity law failure, this approach is unsuitable at all for shooting on the order of hours (it is substantially impossible to perform such shooting with this approach because an entire photo becomes blown out highlights).

Random thermal noise, although it depends on a performance of an imaging device and a shooting environment, appears on a display when the digital camera does not include a cooling mechanism. This can be avoided by cooling; however, in that case, the digital camera also needs to include a mechanism for preventing condensation resulting from cooling, and tends to be large equipment.

It is difficult to reduce random noise with this approach.

A user cannot view a work in progress of exposure.

(3) Long Exposure by Stacking Using Digital Camera
<Advantages>

With this approach, reading from imaging devices and digitization are performed at fixed intervals. Accordingly, shades of gray can be kept even when long exposure by stacking is performed for a period longer than that of normal long exposure of the digital camera.

Color correction can be performed easily.

A user can view a work in progress of exposure.

A user can view a resultant image immediately after shooting.

<Disadvantages>

Because digital cameras are insusceptible to reciprocity law failure, this approach is unsuitable at all for shooting on the order of hours (it is substantially impossible to perform such shooting with this approach because an entire photo becomes blown out highlights).

It is difficult to reduce random noise with this approach.

Continuity of time is broken because overall exposure time is interrupted by time, although being short, necessary to read data from the sensors (this does not matter at a focal length on a wide-angle side in star tail shooting; however, the longer the focal length is, the more greatly this matters).

(4) Lighten Compositing Process Using PC

<Advantages>

Exposure can be determined easily because exposure that is determined for shooting of one image is nearly continuously used with this compositing method.

Color correction can be performed easily.

Even in an environment where subjects that differ largely in luminance are mixed, this approach is less prone to blown out highlights (in a case of shooting an urban scene with star trails, duration of the trails can be lengthened to desired time not later than morning unless a happening such as incoming of light that is unpredictable at start of shooting does not occur).

High-sensitivity shooting can be performed because exposure can be determined for shooting of one photo. Even trails of dark stars (faint stars) that cannot be captured with a film can be captured.

Thermal noise is negligible because exposure is performed not so much as to cause thermal noise to affect image quality. Therefore, the digital camera needs not to include a special cooling mechanism.

The greater the number of images to be stacked, the greater random noise can be reduced in a degree incomparable to the other approaches.

This approach allows producing a composite image in which fireflies look as if they are increased in number by intentionally breaking continuity of time. Continuity of time is intentionally broken also in star trail shooting on some occasions.

<Disadvantages>

Continuity of time is broken because overall exposure time is interrupted by time, although being short, necessary to read data from the sensors (this does not matter at a focal length on a wide-angle side in star tail shooting; however, the longer the focal length is, the more greatly this matters).

A user cannot view a composite image in progress because the lighten compositing process is performed on a PC after shooting.

A user cannot view a resultant image immediately after shooting because the lighten compositing process is performed on a PC after shooting.

As described above, conventional long exposure with a digital camera ((2) and (3) described above) is far inferior to long exposure with a film camera ((1) described above). A main reason therefor is that digital cameras are insusceptible to reciprocal law failure. Furthermore, long exposure with a film camera also gives many inconveniences.

In contrast, the lighten compositing process using a PC ((4) described above) is utilized as an approach that has not only a number of advantages of the other approaches ((1) to (3) described above) but also greatly excels the other approaches. However, this approach requires that a large number of images obtained by interval shooting with a digital camera are transferred to the PC to undergo the compositing process in the PC. Therefore, a photographer can neither envision a finished image during shooting nor can view a resultant photo at a photo shooting location immediately after completion of shooting.

PRIOR ART DOCUMENT

Patent Document

Patent document 1: Japanese Patent Application Laid-open No. 2009-239600

DISCLOSURE OF INVENTION

Problem to be Solved by the Invention

The present invention has been conceived in view of the above circumstances, and it is an object of the invention to provide an image capturing apparatus that implements a function convenient for a user by performing a lighten compositing process while performing a shooting process.

Means for Solving Problem

To achieve the object, an image capturing apparatus according to the present invention includes an image sensor, a storage section, and a display section.

The image capturing apparatus comprises: an interval shooting section that performs an interval shooting process that is a process that repeatedly performs exposure of and reading from the image sensor at predetermined intervals to capture a plurality of images one by one; a lighten compositing section that performs a lighten compositing process using a first image and a second image of the plurality of images captured by the interval shooting process one by one, the first image being an initial image among the plurality of images, the second image being captured subsequent to the first image, and stores a result of the lighten compositing process as a composite image in the storage section, and, as for each image of third and following images, the third image being captured subsequent to the second image, performs the lighten compositing process using the each image and the composite image stored in the storage section and stores a result of the lighten compositing process as a new composite image in the storage section; and a composite-image display section that, when a first operation is performed, causes the display section to display the composite image stored in the storage section without causing the interval shooting process to be stopped.

BRIEF DESCRIPTION OF DRAWINGS

FIG. 10 is a flowchart illustrating a process procedure for a composite-image-in-progress displaying process;

FIG. 11 is a flowchart illustrating a process procedure for a compositing-buffer resetting process;

FIG. 12C is a timing diagram illustrating process states during a period when the interval composite shooting is performed;

FIG. 12D is a timing diagram illustrating process states during a period when the interval composite shooting is performed;

FIG. 13B is a timing diagram illustrating process states in a situation where a second operation is performed during a period when the interval composite shooting is performed; and FIG. 13C is a timing diagram illustrating process states in a situation where the second operation is performed during a period when the interval composite shooting is performed.

BEST MODES FOR CARRYING OUT THE INVENTION

Exemplary embodiments of the present invention are described below with reference to the drawings.

Figure 1A:
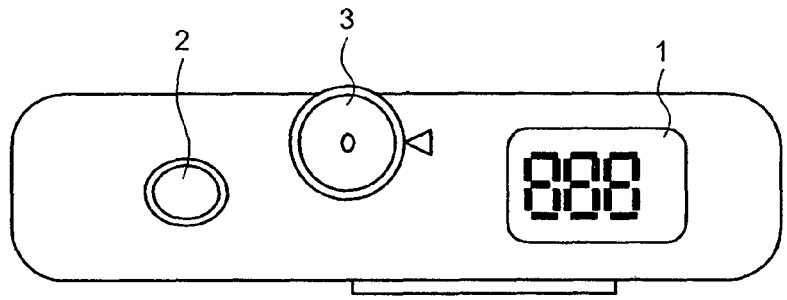
FIG. 1A is a top view of a digital camera according to an embodiment of the present invention.
Figure 1B:
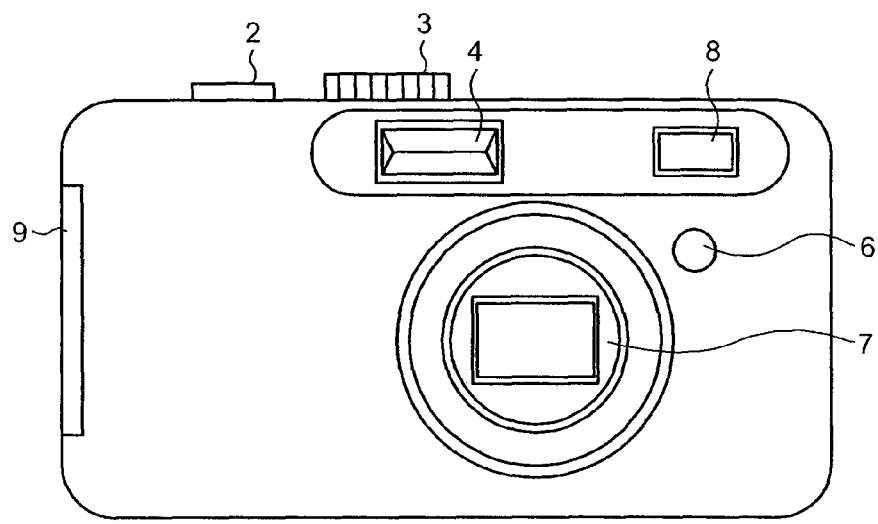
FIG. 1B is a front view of the digital camera according to the embodiment.
Figure 1C:
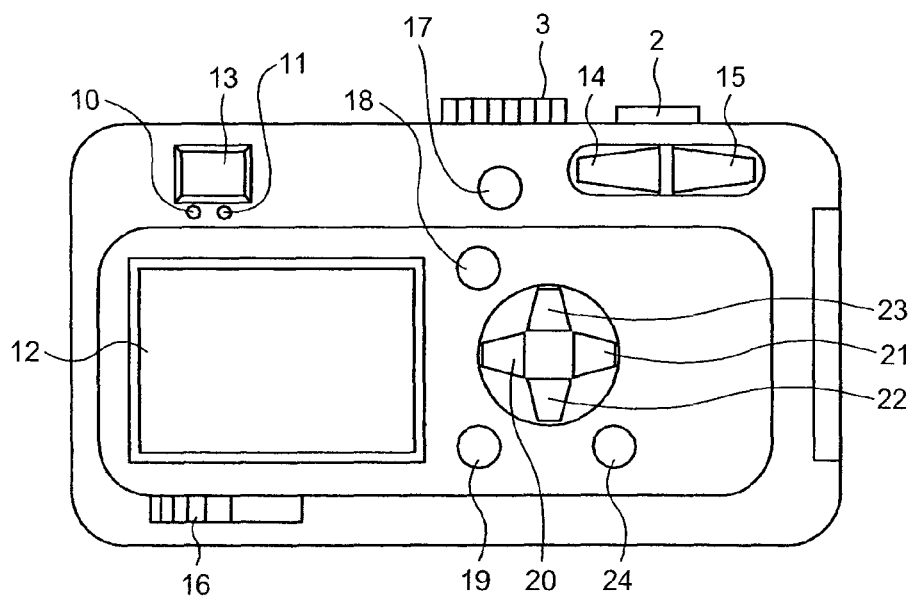
FIG. 1C is a rear view of the digital camera according to the embodiment.

The configuration of a digital camera according to an embodiment of the present invention is described first. FIGS. 1A to 1C are external views of the digital camera according to the present embodiment. FIG. 1A is a top view of the digital camera. FIG. 1B is a front view of the digital camera. FIG. 1C is a rear view of the digital camera.

The digital camera according to the present embodiment includes a sub LCD 1, a release button 2, and a mode dial 3 on a top surface of the digital camera as illustrated in FIG. 1A. The sub LCD 1 is a display section for displaying a maximum number of shots, for example. The release button 2 is a two-position button operable such that, for example, when the release button 2 is pressed to a first position, an automatic focusing (AF) operation is performed, while when the release button 2 is pressed to a second position, shooting is performed. The mode dial 3 is to be operated for switching among various modes, such as a shooting mode for shooting (recording) images, a playback mode for playing back recorded images, and a SETUP mode for configuring camera settings.

The digital camera according to the present embodiment includes a strobe-light emitting section 4, a remote-control-light receiving section 6 for receiving infrared signals from a remote control terminal (not shown), a lens barrel unit 7, and an optical viewfinder (front side) 8 on a front surface of the digital camera as illustrated in FIG. 1B. The digital camera according to the embodiment includes a memory card slot into which a memory card 80, which will be described later, is to be inserted and a battery receptacle for accommodating a battery in a side surface of the digital camera. The memory card slot and the battery receptacle are sealed with a lid 9.

The digital camera according to the present embodiment also includes an automatic focusing LED (AF LED) 10, a strobe LED 11, an LCD monitor 12, and an optical viewfinder (back side) 13 on a back surface of the digital camera as illustrated in FIG. 1C. The AF LED 10 is an LED to be lit when automatic focusing is activated. The strobe LED 11 is an LED to be lit when strobe light is emitted. The LCD monitor 12 is a display section for displaying various setting screens and played-back images and for use as an electronic viewfinder during shooting.

Also arranged on the back surface of the digital camera according to the present embodiment are a ZOOM (WIDE) switch 14, a ZOOM (TELE) switch 15, a power supply switch 16, a playback switch 17, a self-timer/delete switch 18, a MENU/OK switch 19, a leftward/image-viewing switch 20, a rightward switch 21, a downward/macro switch 22, an upward/strobe-light switch 23, and a DISPLAY switch 24. The ZOOM (WIDE) switch 14 is operated when using wide-angle zooming. The ZOOM (TELE) switch 15 is operated when using telephoto zooming. The self-timer/delete switch 18 is operated when using a self timer and when deleting an image. The MENU/OK switch 19 is operated when making a selection from a menu and when confirming a selected option. The leftward/image-viewing switch 20 is operated when moving a cursor on the LCD monitor 12 to the left and when viewing a shot image on the LCD monitor 12. The rightward switch 21 is operated to moving a cursor on the LCD monitor 12 to the right and the like. The downward/macro switch 22 is operated when moving a cursor on the LCD monitor 12 down and when shooting in a macro mode. The upward/strobe-light switch 23 is operated when moving a cursor on the LCD monitor 12 up and when switching a strobe mode. The DISPLAY switch 24 is operated when switching a display on the LCD monitor 12.

Figure 2:
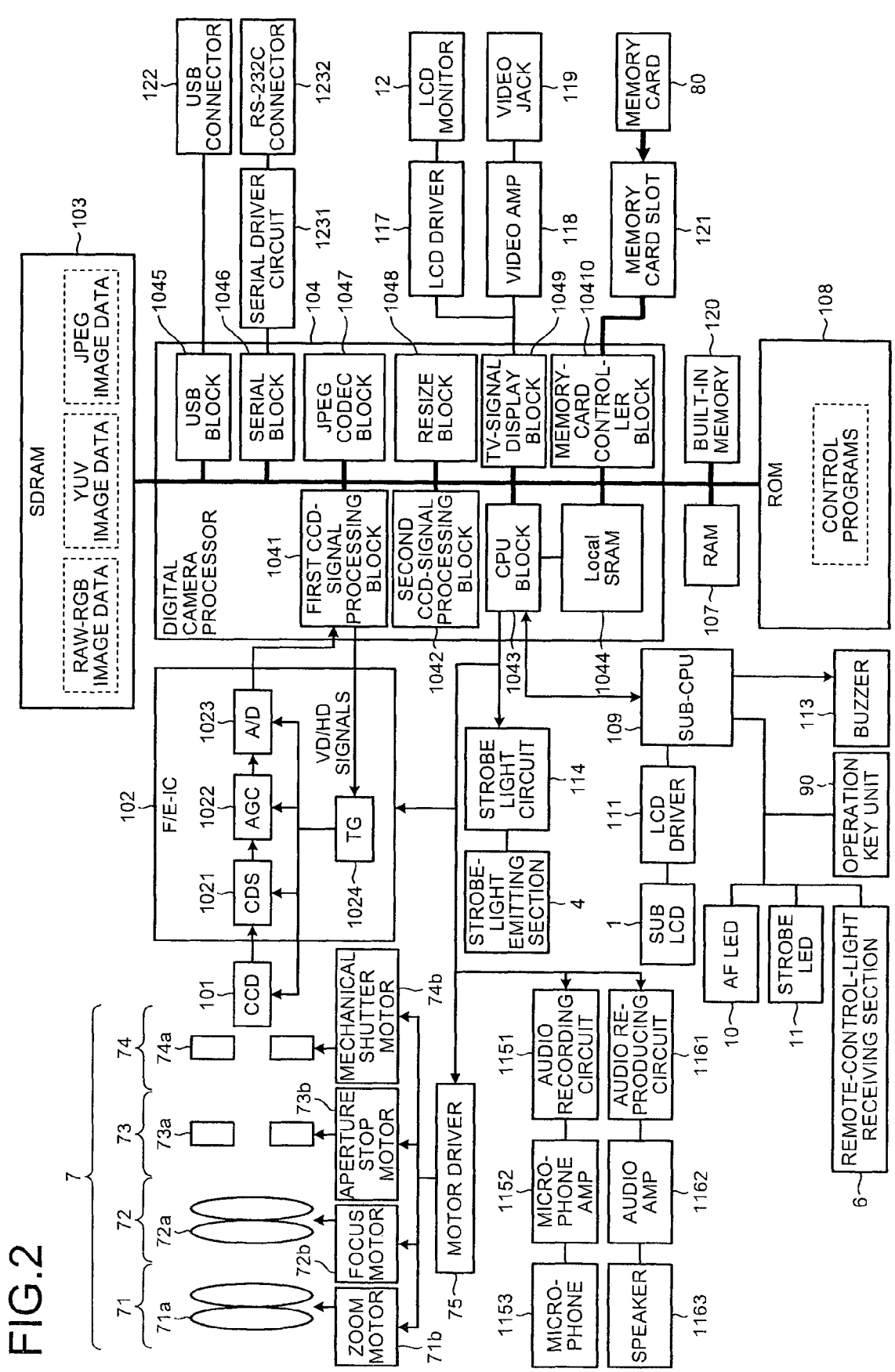
FIG. 2 is a block diagram illustrating the configuration of a control system of the digital camera according to the embodiment.

FIG. 2 is a block diagram illustrating the configuration of a control system of the digital camera according to the present embodiment. The digital camera according to the present embodiment includes a CCD 101, an F/E (front-end)-IC 102, and a digital camera processor (hereinafter, abbreviated as "processor") 104. The CCD 101 performs photoelectric conversion of light entered via the lens barrel unit 7 to output an electrical signal. The F/E-IC 102 pre-processes the analog electrical signal output from the CCD 101 to output a digital signal. The processor 104 processes the digital signal fed from the F/E-IC 102 to execute and control various operations of the digital camera.

The lens barrel unit 7 includes a zoom optical system 71 for capturing an optical image of a subject, a focus optical system 72, an aperture stop unit 73, a mechanical shutter unit 74, and a motor driver 75. The zoom optical system 71 includes a zoom lens 71a and a zoom motor 71b. The focus optical system 72 includes a focus lens 72a and a focus motor 72b. The aperture stop unit 73 includes an aperture stop 73a and an aperture stop motor 73b. The mechanical shutter unit 74 includes a mechanical shutter 74a and a mechanical shutter motor 74b. The motor driver 75 drives the motors. Driving of the motor driver 75 is controlled according to a driving instruction fed from a CPU block 1043, which will be described later, in the processor 104.

The CCD 101 is an image sensor that receives the light entered via the lens barrel unit 7 and performs photoelectric conversion of an optical image of the light to output image data that corresponds to the optical image. Meanwhile, the digital camera according to the present embodiment uses the CCD 101 as the image sensor. Alternatively, other image sensor, such as a CMOS image sensor, may be used in lieu of the CCD 101. When a CMOS image sensor is used as the image sensor, the configuration of the control system is to be somewhat changed; however, description thereabout is omitted.

The F/E-IC 102 includes a CDS 1021, an AGC 1022, an A/D converter 1023, and a TG (timing generator) 1024. The CDS 1021 performs correlative double sampling to remove image noise. The AGC 1022 performs gain control. The A/D converter 1023 converts an analog signal into a digital signal. The TG 1024 generates drive timing signals for the CCD 101, the CDS 1021, the AGC 1022, and the A/D 1023 based on a vertical synchronizing signal (VD signal) and a horizontal synchronizing signal (HD signal) fed from a first CCD-signal processing block 1041, which will be described later, in the processor 104. The CPU block 1043, which will be described later, in the processor 104 controls operations of the components of the F/E-IC 102.

The processor 104 includes the first CCD-signal processing block 1041, a second CCD-signal processing block 1042, the CPU block 1043, a local SRAM 1044, a USB block 1045, a serial block 1046, a JPEG CODEC block 1047, a RESIZE block 1048, a TV-signal display block 1049, and a memory-card controller block 10410. These blocks in the processor 104 are connected to one another over a bus line.

The first CCD-signal processing block 1041 performs white balance compensation and gamma correction on the image data input to the processor 104 from the CCD 101 via the F/E-IC 102, and also feeds the VD signal and the HD signal described above for use in timing control of the image data to the TG 1024. The second CCD-signal processing block 1042 performs filtering on the input image data to convert the image data into luminance data and color-difference data.

The CPU block 1043 controls operations of components of the digital camera according to the present embodiment. More specifically, the CPU block 1043 controls an audio recording operation performed by an audio recording circuit 1151. Audio is converted by a microphone 1153 into audio signals, which are then amplified by a microphone amplifier 1152. The audio recording circuit 1151 records the audio signals according to an instruction fed from the CPU block 1043. The CPU block 1043 also controls an audio reproducing operation performed by an audio reproducing circuit 1161. The audio reproducing circuit 1161 reproduces audio signals recorded in an appropriate memory to input the audio signals to an audio amplifier 1162, causing a speaker 1163 to provide audio according to an instruction fed from the CPU block 1043. The CPU block 1043 also controls operations of a strobe light circuit 114, thereby causing the strobe-light emitting section 4 to emit illumination light. In addition, the CPU block 1043 performs various processes to implement the function (hereinafter, referred to as "interval composite shooting"), which is a function characteristic of the present embodiment, of performing the lighten compositing process while performing an interval shooting process. These are described in detail later.

The CPU block 1043 is connected to a sub CPU 109 arranged external to the processor 104. The sub CPU 109 controls display on the sub LCD 1 via an LCD driver 111. The sub CPU 109 is also connected to the AF LED 10, the strobe LED 11, the remote-control-light receiving section 6, a buzzer 113, and an operation key unit 90. The operation key unit 90 includes various switches which are the release button 2, the mode dial 3, the ZOOM (WIDE) switch 14, the ZOOM (TELE) switch 15, the power supply switch 16, the playback switch 17, the self-timer/delete switch 18, the MENU/OK switch 19, the leftward/image-viewing switch 20, the rightward switch 21, the downward/macro switch 22, the upward/strobe-light switch 23, and the DISPLAY switch 24 described above. The sub CPU 109 utilizes output signals of the operation key unit 90 and the remote-control-light receiving section 6 as user operation information to control operations of the AF LED 10, the strobe LED 11, and the buzzer 113 according to the user operation information. The sub CPU 109 also transmits the user operation information to the CPU block 1043 in the processor 104.

The local SRAM 1044 is a memory for temporarily storing data necessary to perform control and the like. The USB block 1045 carries out USB communications with external equipment, such as a computer terminal, connected to a USB connector 122. The serial block 1046 carries out serial communications via a serial driver circuit 1231 with external equipment, such as a computer terminal, connected to an RS-232C connector 1232.

The JPEG CODEC block 1047 compresses data pertaining to a shot image in a JPEG format and decompresses data pertaining to a recorded image compressed in the JPEG format. The RESIZE block 1048 increases/reduces an image data size by interpolation.

The TV-signal display block 1049 converts image data into video signals to be displayed on an external display device such as the LCD monitor 12 or a TV. The TV-signal display block 1049 is connected to an LCD driver 117 so that an image is displayed on the LCD monitor 12 driven by the LCD driver 117. The TV-signal display block 1049 is also connected to a video AMP 118 so that, when a video jack 119 is connected to external display equipment such as a TV, an image is displayed on the external display equipment.

The memory card controller block 10410 is connected to a memory card slot 121 and controls the memory card 80, a general-purpose PCMCIA, and the like inserted into the memory card slot 121.

An SDRAM 103, a RAM 107, a ROM 108, and a built-in memory 120 are arranged external to the processor 104. These are connected to the processor 104 over the bus line.

The SDRAM 103 is a memory for temporarily stores image data when the processor 104 performs image processing on the image data. Examples of the image data to be stored in the SDRAM 103 include "RAW-RGB image data" fed from the CCD 101 via the F/E-IC 102 and undergone white balance compensation and gamma correction performed by the first CCD-signal processing block 1041, "YUV image data" undergone luminance-data conversion and color-difference-data conversion performed by the second CCD-signal processing block 1042, and "JPEG image data" compressed in the JPEG format by the JPEG CODEC block 1047. The SDRAM 103 includes a first memory area and a second memory area to be utilized in the interval composite shooting, which will be described later.

The ROM 108 stores a control program described in program code decodable by the CPU block 1043 and parameters for use in control. These parameters may alternatively be stored in the built-in memory 120. When the power supply to the digital camera is turned on, the control program is loaded into a main memory (not shown). The CPU block 1043 controls operations of the components according to the control program and temporarily stores data and the like necessary for control in the RAM 107 and the local SRAM 1044 in the processor 104. In the present embodiment, a program for performing the interval composite shooting, which will be described later, is also stored in the ROM 108. In the description of the present embodiment, it is assumed that the interval composite shooting is implemented by the program. Alternatively, a configuration in which a portion of the process, e.g., the lighten compositing process, is performed using special-purpose hardware such as an ASIC (Application Specific Integrated Circuit) or an FPGA (Field-Programmable Gate Array) can be employed.

The built-in memory 120 is a memory for recording data pertaining to a shot image in a case where the memory card 80 is not inserted into the memory card slot 121. The RAM 107 is a memory to be utilized as a working area by the CPU block 1043 when executing various programs.

The interval composite shooting that is characteristic of the digital camera according to the present embodiment is described below. The interval composite shooting is a function of performing the lighten compositing process while performing the interval shooting process as described above.

The interval shooting process is a process that repeatedly performs exposure of and reading (reading image data) from the CCD 101 which is the image sensor at predetermined intervals to capture a plurality of images one by one.

The lighten compositing process is a process that produces a composite image using a plurality of images by comparing luminance of a pixel of one image with luminance of a pixel at the same position of another image, and selects a brighter one of the pixels on a per-pixel-by-pixel basis. As described above, the lighten compositing process is initially performed using the first image and the second image, and a result of this process is stored as a composite image. Thereafter, as for each image of the third and following images, the process is performed using the each image and the composite image which is the result of the preceding process, and an image obtained as a result of this process is stored as new composite image. A final composite image is obtained by performing the above process on every image to be processed.

The digital camera according to the present embodiment performs the lighten compositing process utilizing two memory areas in the SDRAM 103. Each of the two memory areas is a frame memory for holding data corresponding to one image. Hereinafter, one of the two memory areas is referred to as the first memory area, and the other is referred to as the second memory area. The first memory area is a memory to be used as a compositing buffer for the lighten compositing process and stores a composite image which is a result of the lighten compositing process. The second memory area is a memory to be used as a buffer for a not-yet-composited still image. Images captured by the interval shooting process are stored one by one in the second memory area.

Figure 3:
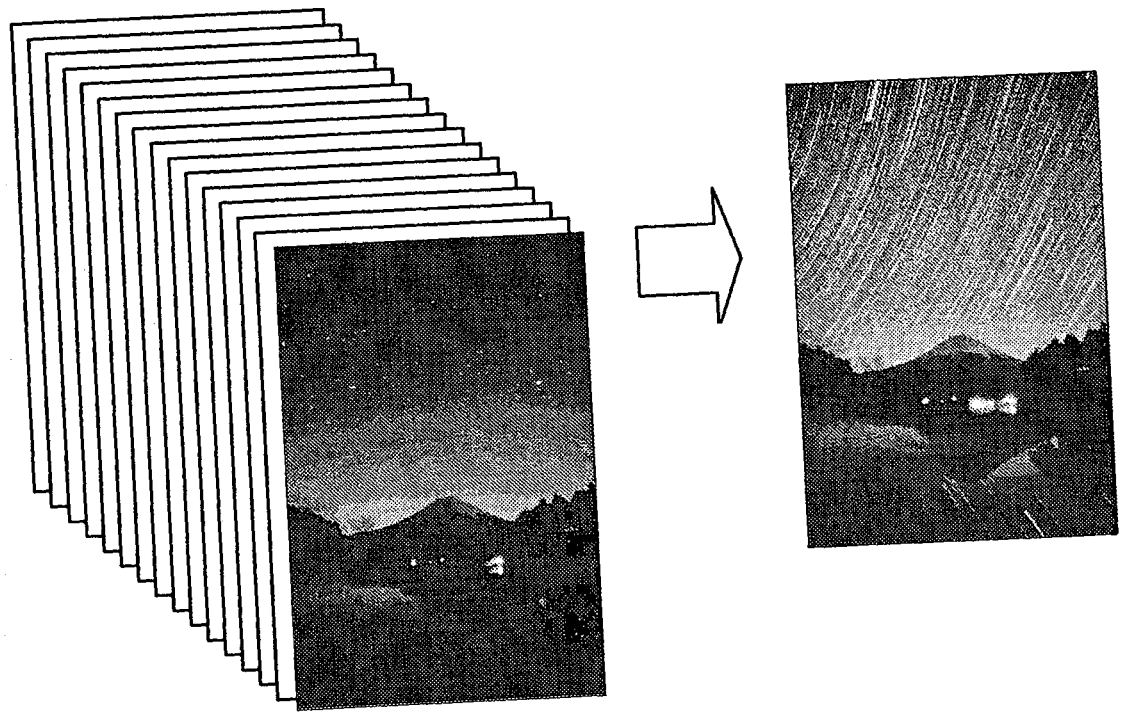
FIG. 3 is a diagram illustrating an example of a composite image obtained by a lighten compositing process.

FIG. 3 is a diagram illustrating an example of the composite image obtained by the lighten compositing process. A group of images to be processed is illustrated on the left of FIG. 3. A composite image obtained by performing the lighten compositing process on the image group is illustrated on the right of FIG. 3. Each of the pixels in the composite image obtained by the lighten compositing process is a pixel having a maximum luminance value among corresponding pixels of the image group. Accordingly, as is the example illustrated in FIG. 3, there can be obtained a composite image that looks as if it was obtained by long exposure in which star trails streak due to diurnal motion of the earth, and in which star-absent night-sky portions and a bright scene coexist without blown out highlights. Meanwhile, for the sake of simplicity, the number of images in the image group illustrated on the left of FIG. 3 is reduced; however, the composite image illustrated on the right of FIG. 3 is produced using over 300 images in practice.

In the interval composite shooting, images captured one by one by the interval composite shooting make up the image group on which the lighten compositing process is to be performed. Each time an image is captured by the interval composite shooting, the lighten compositing process is performed using the captured image. Put another way, the interval composite shooting and the lighten compositing process are performed concurrently. This allows implementing various functions, which will be described later, that are convenient for a user.

Figure 4:
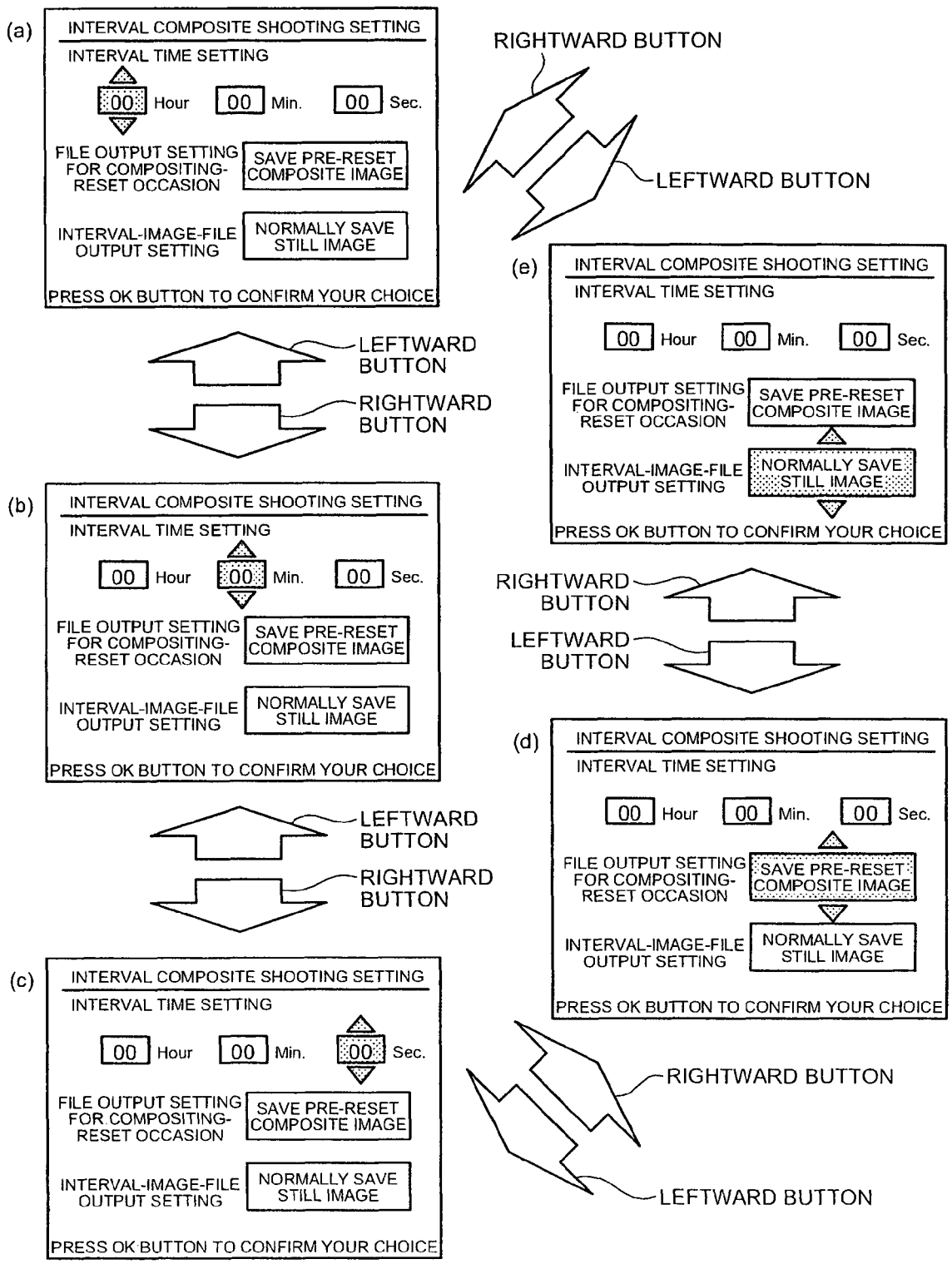
FIG. 4 is a diagram explaining initial setting screens for interval composite shooting and screen transitions that occur on button operations.

The digital camera according to the present embodiment includes an operation mode for performing the interval, composite shooting (hereinafter, referred to as "interval composite shooting mode") as one of shooting modes. The interval composite shooting mode can be selected by operating the mode dial 3, for example. First, initial settings for the interval composite shooting are described with reference to FIG. 4. FIG. 4 is a diagram explaining initial setting screens for the interval composite shooting and screen transitions that occur on button operations.

The initial setting screen for the interval composite shooting illustrated in FIG. 4 appears on the LCD monitor 12 when a user operates the power supply switch 16 to turn on the power supply to the digital camera, selects the interval composite shooting mode by operating the mode dial 3 or the like, configures various settings related to shooting as desired, and thereafter presses the MENU/OK switch 19. The user can configure various settings related to the interval composite shooting on this initial setting screen by selecting a menu item by operating the leftward/image-viewing switch 20 or the rightward switch 21 and selecting an option of each menu item by operating the downward/macro switch 22 or the upward/strobe-light switch 23. Hereinafter, the leftward/image-viewing switch 20, the rightward switch 21, the downward/macro switch 22, and the upward/strobe-light switch 23 are referred to as the leftward button, the rightward button, the downward button, and the upward button, respectively, for brevity.

FIG. 4(*a*) illustrates an example screen of a state that allows setting "digits representing hours" of a shooting interval (i.e., length of time between exposure start and issuance of an instruction for starting exposure for next shooting; this time length is hereinafter referred to as "interval time") of each image in the interval shooting process. By operating the upward button or the downward button in the state illustrated in FIG. 4(*a*), the digits can be changed. Operating the rightward button causes the screen illustrated in FIG. 4(*a*) to transit to the screen illustrated in FIG. 4(*b*). Operating the leftward button causes the screen illustrated in FIG. 4(*a*) to transit to the screen illustrated in FIG. 4(*e*).

FIG. 4(*b*) illustrates an example screen of a state that allows setting "digits representing minutes" of the interval time. By operating the upward button or the downward button in the state illustrated in FIG. 4(*b*), the digits can be changed. Operating the rightward button causes the screen illustrated in FIG. 4(*b*) to transit to the screen illustrated in FIG. 4(*c*). Operating the leftward button causes the screen illustrated in FIG. 4(*b*) to transit to the screen illustrated in FIG. 4(*a*).

FIG. 4(*c*) illustrates an example screen of a state that allows setting "digits representing seconds" of the interval time. By operating the upward button or the downward button in the state illustrated in FIG. 4(*c*), the digits can be changed. Operating the rightward button causes the screen illustrated in FIG. 4(c) to transit to the screen illustrated in FIG. 4(d). Operating the leftward button causes the screen illustrated in FIG. 4(c) to transit to the screen illustrated in FIG. 4(b).

FIG. 4(d) illustrates an example screen of a state that allows setting as to whether to save data held in the first memory area, that is, the composite image that has been produced, when the first memory area used as the compositing buffer for the lighten compositing process is reset in response to reset of the interval composite shooting during the interval composite shooting. By operating the upward button or the downward button in this state illustrated in FIG. 4(d), one of "SAVE PRE-RESET COMPOSITE IMAGE" and "SAVE NONE" options can be selected for a "FILE OUTPUT SETTING FOR COMPOSITING-RESET OCCASION" menu item. Operating the rightward button causes the screen illustrated in FIG. 4(d) to transit to the screen illustrated in FIG. 4(e). Operating the leftward button causes the screen illustrated in FIG. 4(d) to transit to the screen illustrated in FIG. 4(c). "SAVE PRE-RESET COMPOSITE IMAGE" is an option for outputting a composite image having been produced until just before the lighten compositing process is reset in an image file form and storing the image file in the memory card 80 or the like. "SAVE NONE" is an option for not storing the composite image having been produced until just before the lighten compositing process is reset.

FIG. 4(e) illustrates an example screen of a state that allows setting as to whether to save images for use in the interval composite shooting. By operating the upward button or the downward button in this state illustrated in FIG. 4(e), one of "NORMALLY SAVE STILL IMAGE", "SAVE COMPOSITE STILL IMAGE", "NORMALLY SAVE MOVIE", "SAVE COMPOSITE MOVIE", and "SAVE NONE" options is selected for an "INTERVAL-IMAGE-FILE OUTPUT SETTING" menu item. Operating the rightward button causes the screen illustrated in FIG. 4(e) to transit to the screen illustrated in FIG. 4(a). Operating the leftward button causes the screen illustrated in FIG. 4(e) to transit to the screen illustrated in FIG. 4(d). "NORMALLY SAVE STILL IMAGE" is an option for, each time an image is captured in the interval shooting process, outputting the not-yet-composited image (still image) in an image file form and storing the image file in the memory card 80 or the like. "SAVE COMPOSITE STILL IMAGE" is an option for, each time an image is captured by the interval shooting process, outputting a composite image (still image) in progress as of this point in time in an image file form and storing the image file in the memory card 80 or the like. "NORMALLY SAVE MOVIE" is an option for, each time an image is captured by the interval shooting process, generating a movie file that contains the not-yet-composited image (still image) as one frame of a movie and storing the file in the memory card 80 or the like. "SAVE COMPOSITE MOVIE" is an option for, each time an image is captured by the interval shooting process, generating a movie file that contains a composite image (still image) in progress as of this point in time as one frame of a movie and storing the file in the memory card 80 or the like. "SAVE NONE" is an option for not storing images for use in the interval composite shooting (note that when the "FILE OUTPUT SETTING FOR COMPOSITING-RESET OCCASION" menu item is set to the "SAVE PRE-RESET COMPOSITE IMAGE" option, a composite image produced just before reset is stored).

Setting of each menu item can be confirmed by pressing the MENU/OK switch 19 regardless of which one of the initial setting screens illustrated in FIG. 4 is displayed on the LCD monitor 12. Thereafter, when the release button 2 is pressed to the second position (all-the-way-down pressing operation), the interval composite shooting is started.

Figure 5:
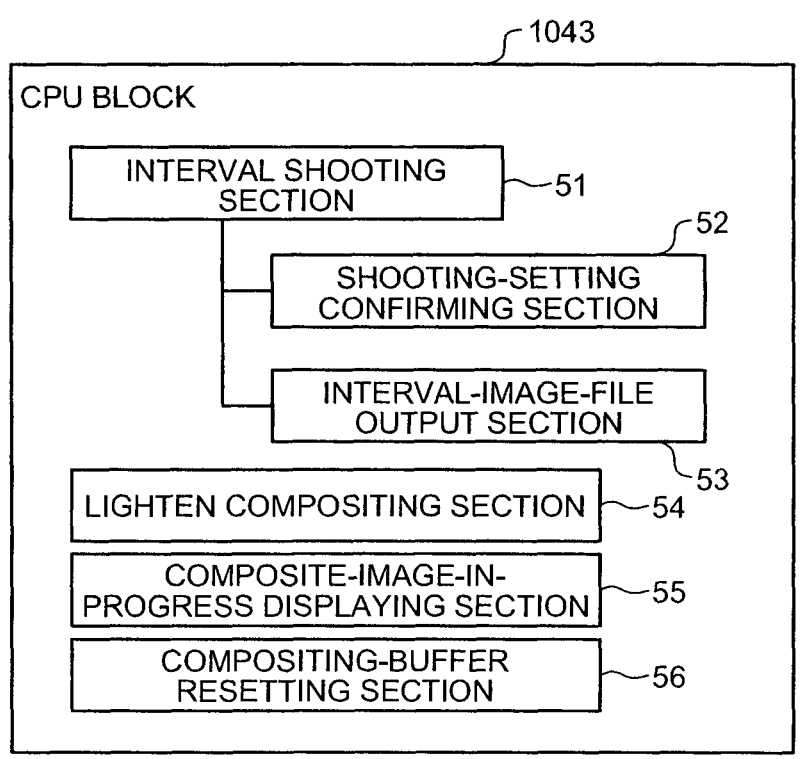
FIG. 5 is a functional block diagram illustrating a functional configuration of a CPU block related to the interval composite shooting.

FIG. 5 is a functional block diagram illustrating a functional configuration of the CPU block 1043 related to the interval composite shooting. As described above, the processes involved in the interval composite shooting are performed by a program, for example. The CPU block 1043 includes an interval shooting section 51, a shooting-setting confirming section 52, an interval-image-file output section 53, a lighten compositing section 54, a composite-image-in-progress displaying section 55, and a compositing-buffer resetting section 56 as functional components that execute the processes involved in the interval composite shooting.

The interval shooting section 51 executes the "interval shooting process". A concrete process procedure for the "interval shooting process" to be executed by the interval shooting section 51 is described later with reference to FIG. 6.

The shooting-setting confirming section 52 executes a "shooting-setting confirming process". A concrete process procedure for the "shooting-setting confirming process" to be executed by the shooting-setting confirming section 52 is described later with reference to FIG. 8.

The interval-image-file output section 53 executes an "interval-image-file output process". A concrete process procedure for the "interval-image-file output process" to be executed by the interval-image-file output section 53 is described later with reference to FIG. 9.

The lighten compositing section 54 executes the "lighten compositing process". A concrete process procedure for the "lighten compositing process" to be executed by the lighten compositing section 54 is described later with reference to FIG. 7.

The composite-image-in-progress displaying section 55 executes a "composite-image-in-progress displaying process". A concrete process procedure for the "composite-image-in-progress displaying process" to be executed by the composite-image-in-progress displaying section 55 is described later with reference to FIG. 10.

The compositing-buffer resetting section 56 executes a "compositing-buffer resetting process". A concrete process procedure for the "compositing-buffer resetting process" to be executed by the compositing-buffer resetting section 56 is described later with reference to FIG. 11.

Among the processes to be executed by the CPU block 1043 in the interval composite shooting mode of the digital camera according to the present embodiment, the "shooting-setting confirming process" and the "interval-image-file output process" are executed sequentially in such a manner as in a function call from the "interval shooting process". The other processes which are the "lighten compositing process", the "composite-image-in-progress displaying process", and the "compositing-buffer resetting process" are concurrently executed by multitasking.

Interval composite shooting operations are described below with reference to the flowcharts illustrated in FIGS. 6 to 11.

Figure 6:
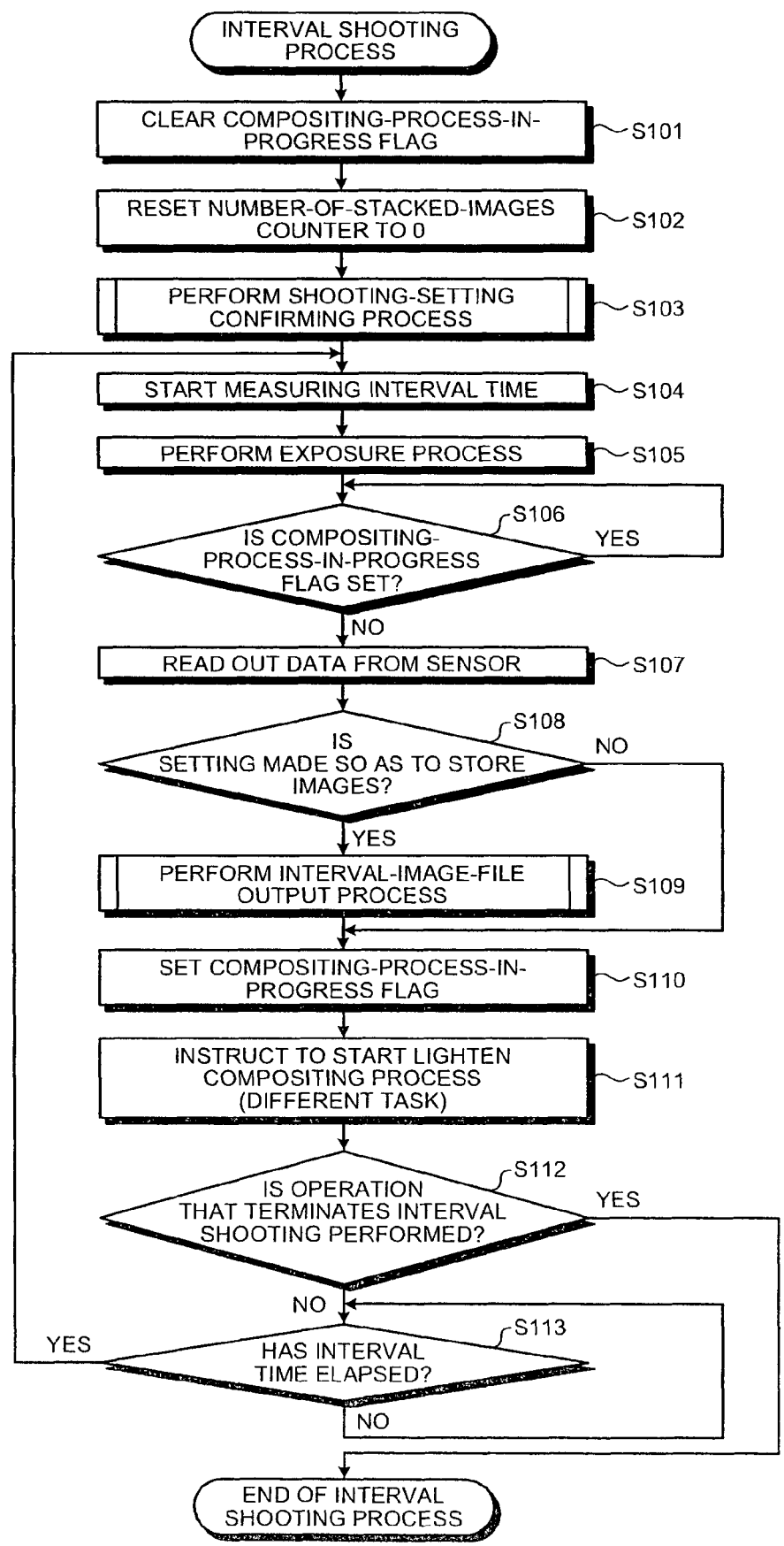
FIG. 6 is a flowchart illustrating a process procedure for an interval shooting process.

FIG. 6 is a flowchart illustrating the process procedure for the "interval shooting process" to be performed by the interval shooting section 51 of the CPU block 1043. The control flow illustrated in FIG. 6 is a main routine of the interval composite shooting, and controls timing for starting the "lighten compositing process" while performing the "interval shooting process" and the like.

First, a process of clearing a compositing-process-in-progress flag is performed at Step S101. A process of resetting a number-of-stacked-images counter to zero is performed at Step S102. The compositing-process-in-progress flag is a flag indicating whether the "lighten compositing process" is during execution. The number-of-stacked-images counter is a counter indicating a position of an image currently composited by the "lighten compositing process" in a sequential order of images. These processes at Step S101 and Step S102 are processes for resetting variables in the program.

Subsequently, the "shooting-setting confirming process" is performed at Step S103. The "shooting-setting confirming process" is a process that performs an AF (automatic focusing) process and an AE (automatic exposure control) process to determine a focus position and exposure before a series of the interval shooting processes is performed. As described above, the "shooting-setting confirming process" is called from the "interval shooting process" in such a manner as in a function call and executed as a subroutine. The process procedure for the "shooting-setting confirming process" is described later.

Subsequently, a process of starting interval time measurement is performed at Step S104. This process is a process that activates a built-in timer to measure interval time.

Subsequently, an exposure process is performed at Step S105. The exposure process is a process that performs exposure of the CCD 101 which is the image sensor. Even when exposure is completed, data is not read from the CCD 101 yet in this process.

Subsequently, determination as to whether the compositing-process-in-progress flag is set is made at Step S106. This process is a process that determines whether compositing of an image captured by preceding shooting in the series of interval shooting processes is completed by referring to variables in the program. When the compositing of the image captured by the preceding shooting is not completed yet and the compositing-process-in-progress flag is set (Yes at Step S106), the control flow is put on wait until the compositing process is completed. When the compositing of the image captured by the preceding shooting is completed and the compositing-process-in-progress flag is cleared (No at Step S106), the control flow proceeds to a next step.

Subsequently, a process of reading data from the CCD 101 which is the image sensor is performed at Step S107. This process is a process that reads an image obtained by exposure of the CCD 101 from the CCD 101 and stores the image in the second memory area.

Subsequently, determination as to whether the initial setting described above is made so as to store images for use in the interval composite shooting is made at Step S108. When the setting is made so as to store images for use in the interval composite shooting (Yes at Step S108), the "interval-image-file output process" is performed. When the setting is made so as not to store images for use in the interval composite shooting (No at Step S108), the "interval-image-file output process" is skipped.

Subsequently, the "interval-image-file output process" is performed at Step S109. The "interval-image-file output process" is a process that stores an image for use in the interval composite shooting based on the initial setting made by a user. As described above, the "interval-image-file output process" is called from the "interval shooting process" in such a manner as in a function call and executed as a subroutine. The process procedure for the "interval-image-file output process" is described later.

Subsequently, a process of setting the compositing-process-in-progress flag is performed at Step S110. This process is a process that sets a variable in the program.

Subsequently, a process of instructing to start the "lighten compositing process" is performed at Step S111. This process is a process that starts the "lighten compositing process" that is executed concurrently with the "interval shooting process". The process procedure for the "lighten compositing process" is described later.

Subsequently, determination as to whether an operation that terminates the interval shooting process is performed is made at Step S112. Examples of the operation that terminates the interval shooting process includes the operation (all-the-way-down pressing operation) of pressing the release button 2 to the second position. When such an operation that terminates the interval shooting process is performed (Yes at Step S112), the interval shooting process is terminated. When such an operation that terminates the interval shooting process is not performed (No at Step S112), the control flow proceeds to a next step.

Subsequently, determination as to whether the interval time has elapsed is made at Step S113. This process is a process that determines whether time to shoot a next image has come based on the interval time specified by a user in the initial setting described above. When the interval time has not elapsed yet and therefore the time to shoot a next image has not come yet (No at Step S113), the control flow is put on wait until the interval time elapses. When the interval time has elapsed and the time to shoot the next image has come (Yes at Step S113), the control flow returns to Step S104 to start interval time measurement and shoot the next image.

Figure 7:
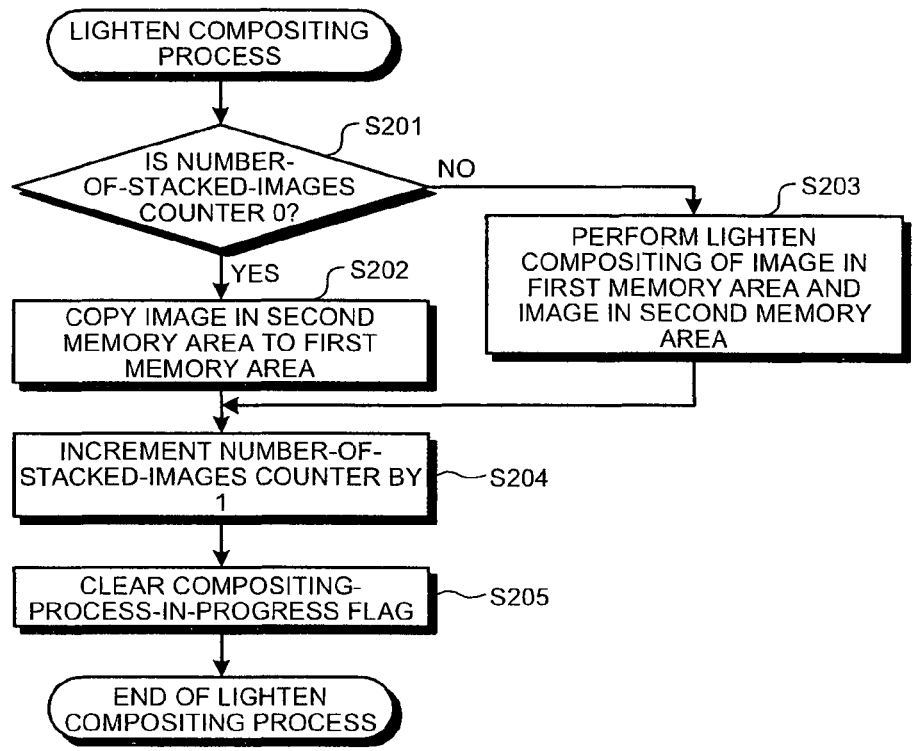
FIG. 7 is a flowchart illustrating a process procedure for the lighten compositing process.

FIG. 7 is a flowchart illustrating the process procedure for the "lighten compositing process" to be performed by the lighten compositing section 54 of the CPU block 1043. This control flow illustrated in FIG. 7 is executed concurrently with the control flow illustrated in FIG. 6 by multitasking. Meanwhile, description about the lighten compositing process is omitted because it has already been described above in detail.

First, determination as to whether the number-of-stacked-images counter is zero is made at Step S201. This process is a process that determines whether to reset the first memory area for use as the compositing buffer. The number-of-stacked-images counter is set to zero at the first shooting in the "interval shooting process" or at the first shooting after the "compositing-buffer resetting process", which will be described later, has been performed. When the number-of-stacked-images counter is zero, that is, when shooting to be performed is the first shooting in the "interval shooting process" or the first shooting after the "compositing-buffer resetting process" has been performed (Yes at Step S201), the control flow proceeds to Step S202. On the other hand, when the number-of-stacked-images counter is not zero, that is, when the shooting to be performed is neither the first shooting in the "interval shooting process" nor the first shooting after the "compositing-buffer resetting process" has been performed (No at Step S201), the control flow proceeds to Step S203.

A process of copying the image stored in the second memory area, that is, the image captured by the "interval shooting process", to the first memory area is performed at Step S202.

At Step S203, the lighten compositing process is performed using the image stored in the second memory area, that is, the image captured by the "interval shooting process", and a composite image stored in the first memory area, that is, the composite image produced by a preceding lighten compositing process, and a new composite image which is a result of the lighten compositing process is stored in the second memory area.

Subsequently, a process of incrementing the number-of-stacked-images counter by one is performed at Step S204.

Subsequently, a process of clearing the compositing-process-in-progress flag is performed at Step S205.

Figure 8:
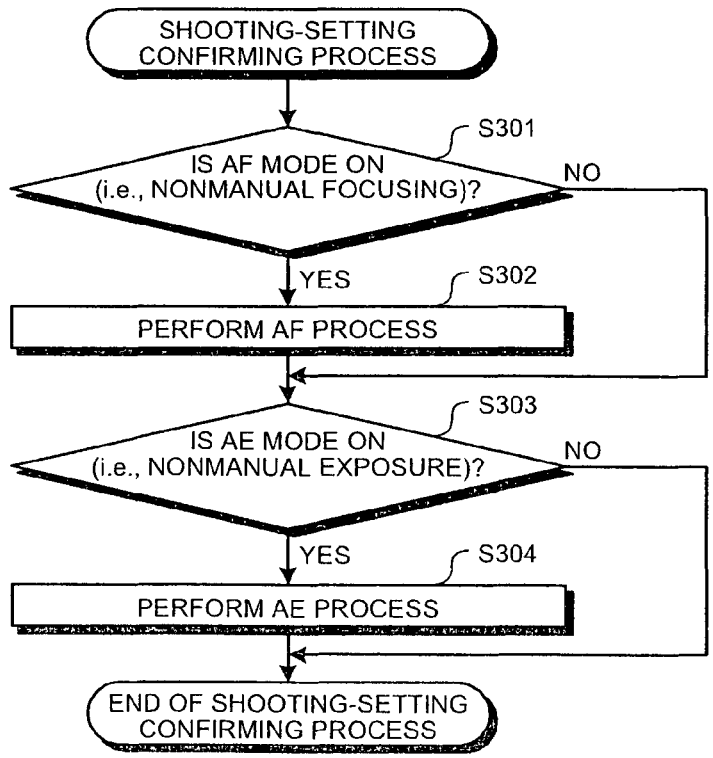
FIG. 8 is a flowchart illustrating a process procedure for a shooting-setting confirming process.

FIG. 8 is a flowchart illustrating the process procedure for the "shooting-setting confirming process" to be performed by the shooting-setting confirming section 52 of the CPU block 1043. The control flow illustrated in FIG. 8 is a subroutine called from the control flow illustrated in FIG. 6.

First, determination as to whether the AF mode is on is made at Step S301. The AF mode is a mode for specifying whether to perform the AF (automatic focusing) process during shooting. When the AF mode is on, the AF process is to be performed, while when the AF mode is off, focusing is to be manually performed. When the AF mode is on (Yes at Step S301), the control flow proceeds to Step S302 where the AF process is performed. On the other hand, when the AF mode is off (No at Step S301), the control flow skips the AF process at Step S302 and proceeds to Step S303.

Subsequently, determination as to whether the AE mode is on is made at Step S303. The AE mode is a mode for specifying whether to perform the AE (automatic exposure control) process during shooting. When the AE mode is on, the AE process is to be performed, while when the AE mode is off, exposure control is to be manually performed. When the AE mode is on (Yes at Step S303), the control flow proceeds to Step S304 where the AE process is performed. On the other hand, when the AE mode is off (No at Step S303), processing is terminated.

The "shooting-setting confirming process" of the control flow illustrated in FIG. 8 is performed when capturing the first image in the "interval shooting process". In a case where the AF mode is on, the AF process is performed when the first image is captured, and a result of the AF process is held. Then, each of the second and following images is captured using the result of the AF process obtained when the first image is captured. In a case where the AE mode is on, the AE process is performed when the first image is captured, and a result of the AE process is held. Then, each of the second and following images is captured using the result of the AE process obtained when the first image is captured.

Figure 9:
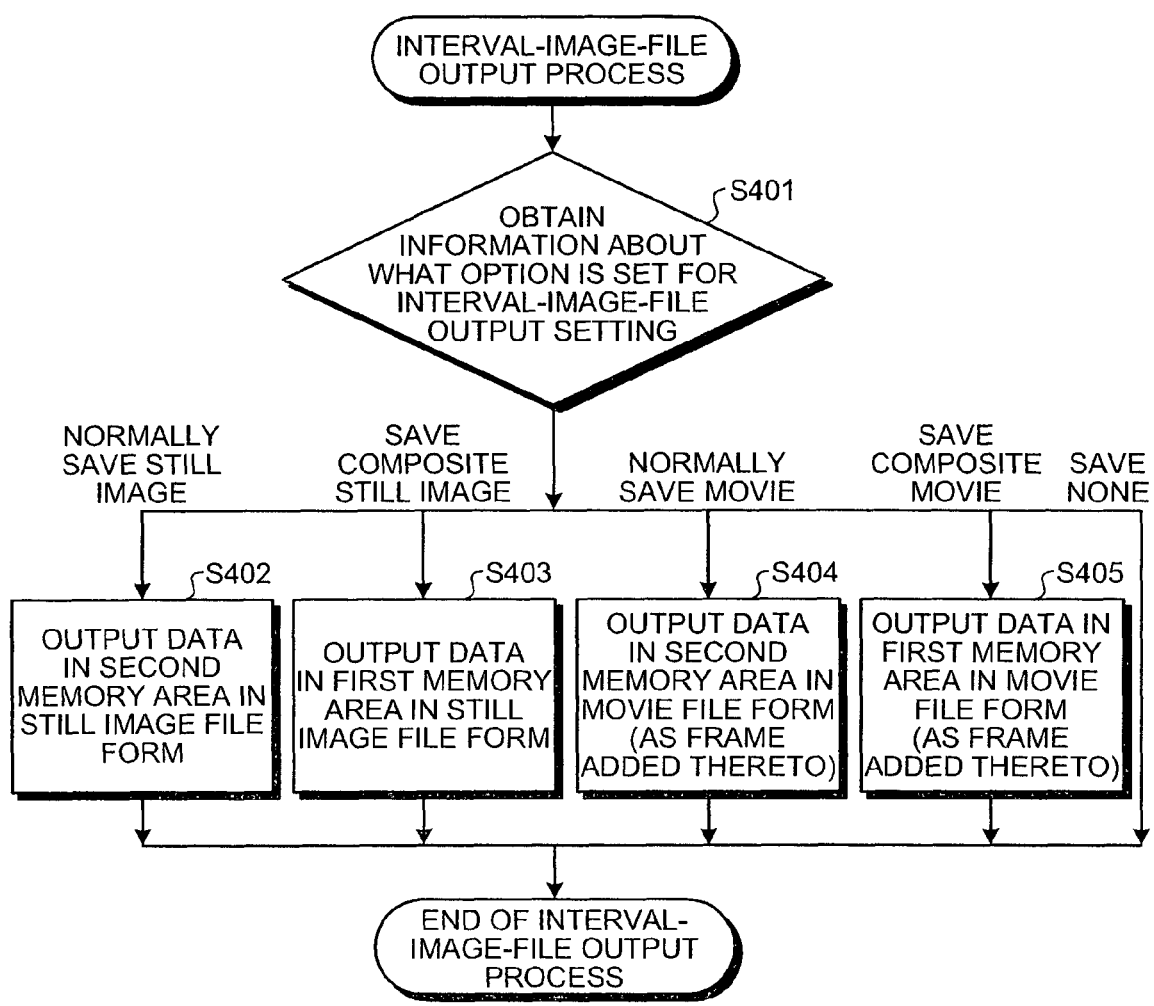
FIG. 9 is a flowchart illustrating a process procedure for an interval-image-file output process.

FIG. 9 is a flowchart illustrating the process procedure for the "interval-image-file output process" to be performed by the interval-image-file output section 53 of the CPU block 1043. The control flow illustrated in FIG. 9 is a subroutine called from the control flow illustrated in FIG. 6.

First, a process of obtaining information about what option is set for the "INTERVAL-IMAGE-FILE OUTPUT SETTING" menu item (see FIG. 4) at the initial setting described above is performed at Step S401. When the option set for the "INTERVAL-IMAGE-FILE OUTPUT SETTING" menu item is "NORMALLY SAVE STILL IMAGE", the control flow proceeds to Step S402. When the option is "SAVE COMPOSITE STILL IMAGE", the control flow proceeds to Step S403. When the option is "NORMALLY SAVE MOVIE", the control flow proceeds to Step S404. When the option is "SAVE COMPOSITE MOVIE", the control flow proceeds to Step S405. When the option is "SAVE NONE", processing is terminated.

A process of outputting the data stored in the second memory area, that is, the not-yet-composited image captured by the "interval shooting process", in a still image file form and storing the file in the memory card 80 or the like is performed at Step S402.

A process of outputting the data stored in the first memory area, that is, the composite image in progress of the "lighten compositing process" as of this point in time, in a still image file form and storing the file in the memory card 80 or the like is performed at Step S403.

A process of producing a movie file that contains the data stored in the second memory area, that is, the not-yet-composited image captured by the "interval shooting process", as one frame of a movie and storing the file in the memory card 80 or the like is performed at Step S404. Each time a new image is captured by the "interval shooting process", the image is added to this movie file as one frame of the movie.

A process of producing a movie file that contains the data stored in the first memory area, that is, the composite image in progress of the "lighten compositing process" as of this point in time, as one frame of a movie and storing the file in the memory card 80 or the like is performed at Step S405. Each time a new image is captured by the "interval shooting process", the composite image in progress at the point in time is added to this movie file as one frame of the movie.

FIG. 10 is a flowchart illustrating the process procedure for the "composite-image-in-progress displaying process" to be performed by the composite-image-in-progress displaying section 55 of the CPU block 1043. The control flow illustrated in FIG. 10 is started when a predetermined first operation which is, for example, an operation of pressing the release button 2 to the first position (halfway-down pressing operation) is performed during the interval composite shooting operations. The control flow is executed concurrently with the control flow illustrated in FIG. 6 or the control flow illustrated in FIG. 7 by multitasking.

First, determination as to whether the compositing-process-in-progress flag is set is made at Step S501. This process is a process that causes the control flow not to proceed to a next step until the compositing-process-in-progress flag is cleared. Over a period when the compositing-process-in-progress flag is set (Yes at Step S501), polling is performed. When the compositing-process-in-progress flag is cleared (No at Step S501), the control flow proceeds to Step S502.

Subsequently, determination as to whether the number-of-stacked-images counter is zero is made at Step S502. This process is a process that causes the control flow not to proceed to a next step until the number-of-stacked-images counter becomes a value other than zero (until an image to be displayed is generated). Over a period when the number-of-stacked-images counter is zero (Yes at Step S502), polling is performed. When the number-of-stacked-images counter becomes a value other than zero (No at Step S502), the control flow proceeds to Step S503.

Subsequently, a process of displaying the data stored in the first memory area, that is, the composite image in progress of the "lighten compositing process" as of this point in time, and the value of the number-of-stacked-images counter, that is, the number of still images used to produce the composite image, on the LCD monitor 12 is performed at Step S503.

Subsequently, determination as to whether display time has elapsed is made at Step S504. The display time may be a predetermined fixed value; or, alternatively, may be set by a user. Whether the display time has elapsed cane be determined, for example, based on a value of a built-in timer that is activated when the displaying at Step S503 is started. Over a period when the display time has not elapsed yet (No at Step S504), the display on the LCD monitor 12 is maintained (as-is status). When the display time has elapsed (Yes at Step S504), the control flow proceeds to Step S505.

A process of clearing the display on the LCD monitor 12 is performed at Step S505.

FIG. 11 is a flowchart illustrating the process procedure for the "compositing-buffer resetting process" to be performed by the compositing-buffer resetting section 56 of the CPU block 1043. The control flow illustrated in FIG. 11 is started when a predetermined second operation which is, for example, an operation of pressing the self-timer/delete switch 18 is performed during the interval composite shooting operations. The control flow is executed concurrently with the control flow illustrated in FIG. 6 or the control flow illustrated in FIG. 7 by multitasking.

First, determination as to whether the compositing-process-in-progress flag is set is made at Step S601. This process is a process that causes the control flow not to proceed to a next step until the compositing-process-in-progress flag is cleared. Over a period when the compositing-process-in-progress flag is set (Yes at Step S601), polling is performed. When the compositing-process-in-progress flag is cleared (No at Step S601), the control flow proceeds to Step S602.

A process of resetting the number-of-stacked-images counter to zero is performed at Step S602. This process causes the control flow illustrated in FIG. 7 to branch to a Yes route at Step S201. As a result, the "lighten compositing process" is reset.

Subsequently, a process of obtaining information about what option is set for the "FILE OUTPUT SETTING FOR COMPOSITING-RESET OCCASION" menu item (see FIG. 4) at the initial setting described above is performed at Step S603. When the option set for the "FILE OUTPUT SETTING FOR COMPOSITING-RESET OCCASION" menu item is "SAVE PRE-RESET COMPOSITE IMAGE", the control flow proceeds to Step S604, while when the option is "SAVE NONE", processing is terminated.

A process of outputting the data stored in the first memory area, that is, the composite image immediately preceding reset of the "lighten compositing process", in an image file form and storing the file in the memory card 80 or the like is performed at Step S604.

FIGS. 12A to 12D are timing diagrams each illustrating process states during a period when the interval composite shooting is performed. In the present embodiment, it is assumed that the "lighten compositing process" is performed by software (program) and therefore requires processing time of approximately one second. However, if the "lighten compositing process" is performed using special-purpose hardware, the processing time can be reduced. The timing diagrams illustrated in FIGS. 12A to 12D indicate how process states during a period when the interval composite shooting is performed varies depending on setting of interval time and setting of exposure time in a condition where the processing time required by the "lighten compositing process" described above is substantially uniform.

The second memory area is a memory in which images captured by the interval shooting process are to be stored one by one as described above. In each period indicated by "WRITING" in the drawings, data from the CCD 101 which is the image sensor is written to the second memory area. Each period indicated by "OUTPUT ENABLED" in the drawings is a period during which a change in value does not occur during memory read and therefore memory read or file output can be performed.

The first memory area is a memory in which a composite image which is a result of the "lighten compositing process" is to be stored as described above. The period indicated by "COPYING" or "COMPOSITING PROCESS IN PROGRESS" is a period during which stored data in the memory is possibly changed by the "lighten compositing process". Each period indicated by "OUTPUT ENABLED" in the drawings is a period during which a change in value does not occur during memory read and therefore memory read or file output can be performed.

Figure 12A:
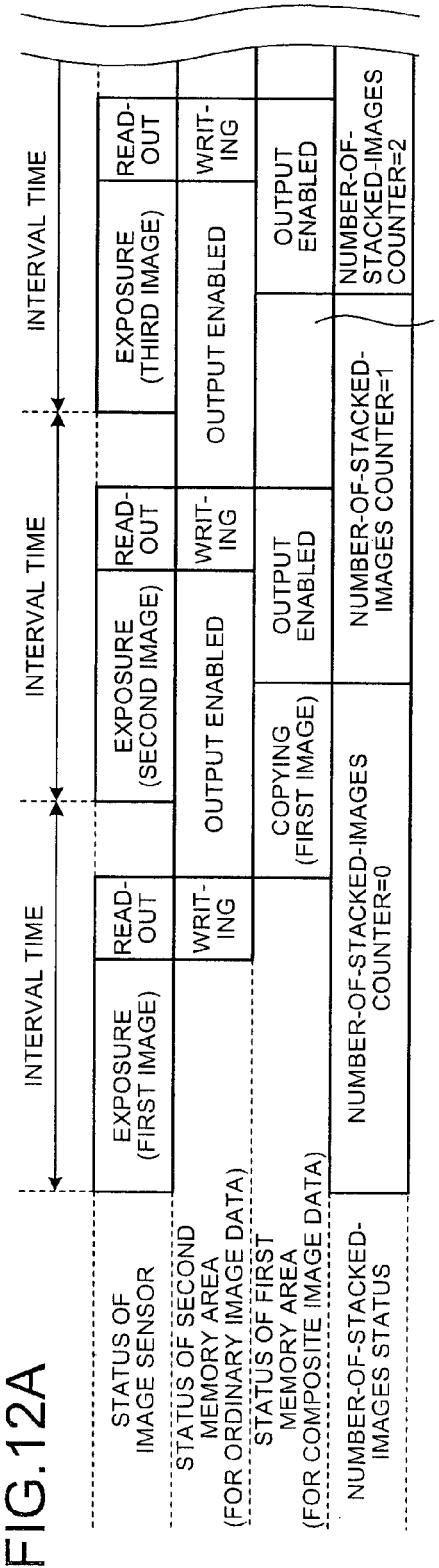
FIG. 12A is a timing diagram illustrating process states during a period when the interval composite shooting is performed.

FIG. 12A is a timing diagram for a case where the exposure time is relatively long and a set value of the interval time is still longer than the exposure time. This is a timing diagram for nighttime shooting settings suitable for such a photo in which lights of fireflies are overlaid and to which long intervals between shootings does not matter.

Figure 12B:
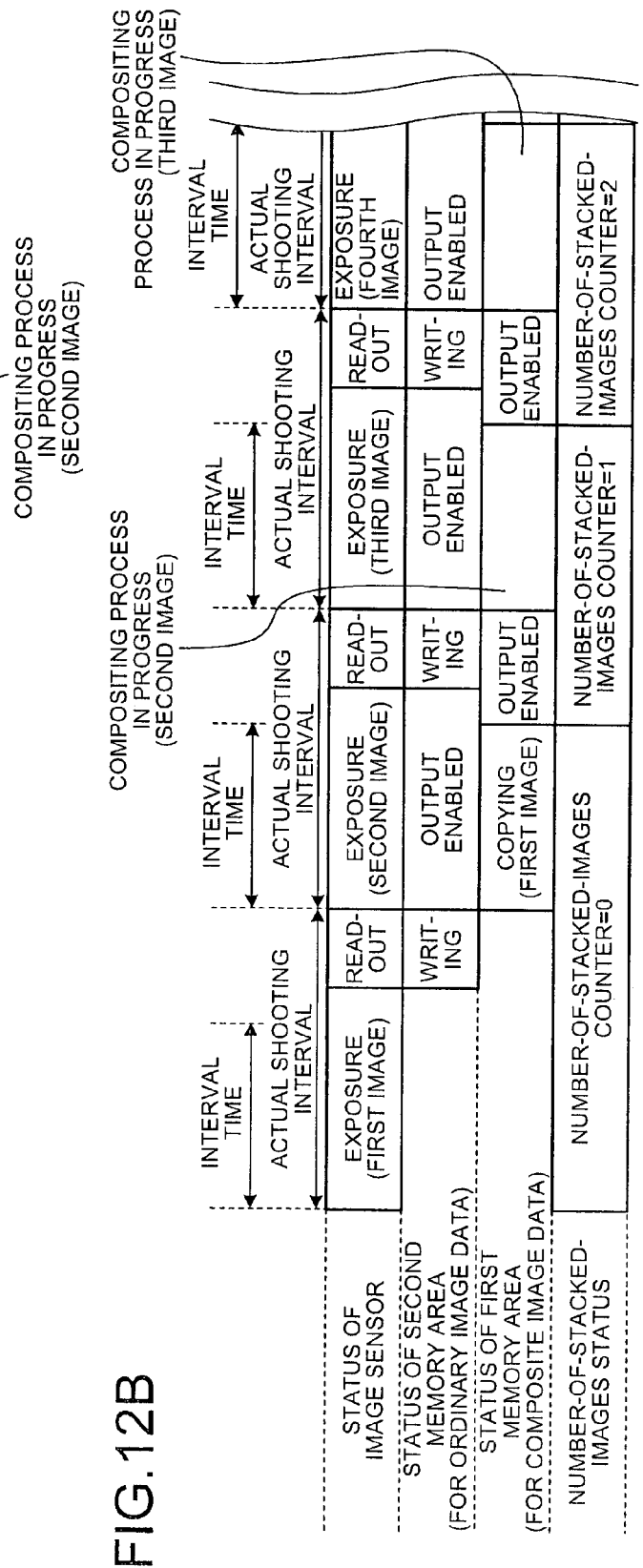
FIG. 12B is a timing diagram illustrating process states during a period when the interval composite shooting is performed.

FIG. 12B is a timing diagram for a case where the exposure time is relatively long and a set value of the interval time is shorter than a minimum shooting-available cycle. This is a timing diagram for nighttime shooting settings suitable for such a photo that captures star trails and to be shot with minimum shooting intervals.

FIG. 12C is a timing diagram for a case where the exposure time is relatively short and a set value of the interval time is relatively long as in the case of FIG. 12A. This is suitable for daytime shooting to obtain a photo that does not require time continuity.

FIG. 12D is a timing diagram for a case where the exposure time is relatively short and a set value of the interval time is shorter than the minimum shooting-available cycle. This is suitable for daytime shooting to record a phenomenon that can be captured without time continuity but changes more quickly than that of the example illustrated in FIG. 12C in one image.

Figure 13A:
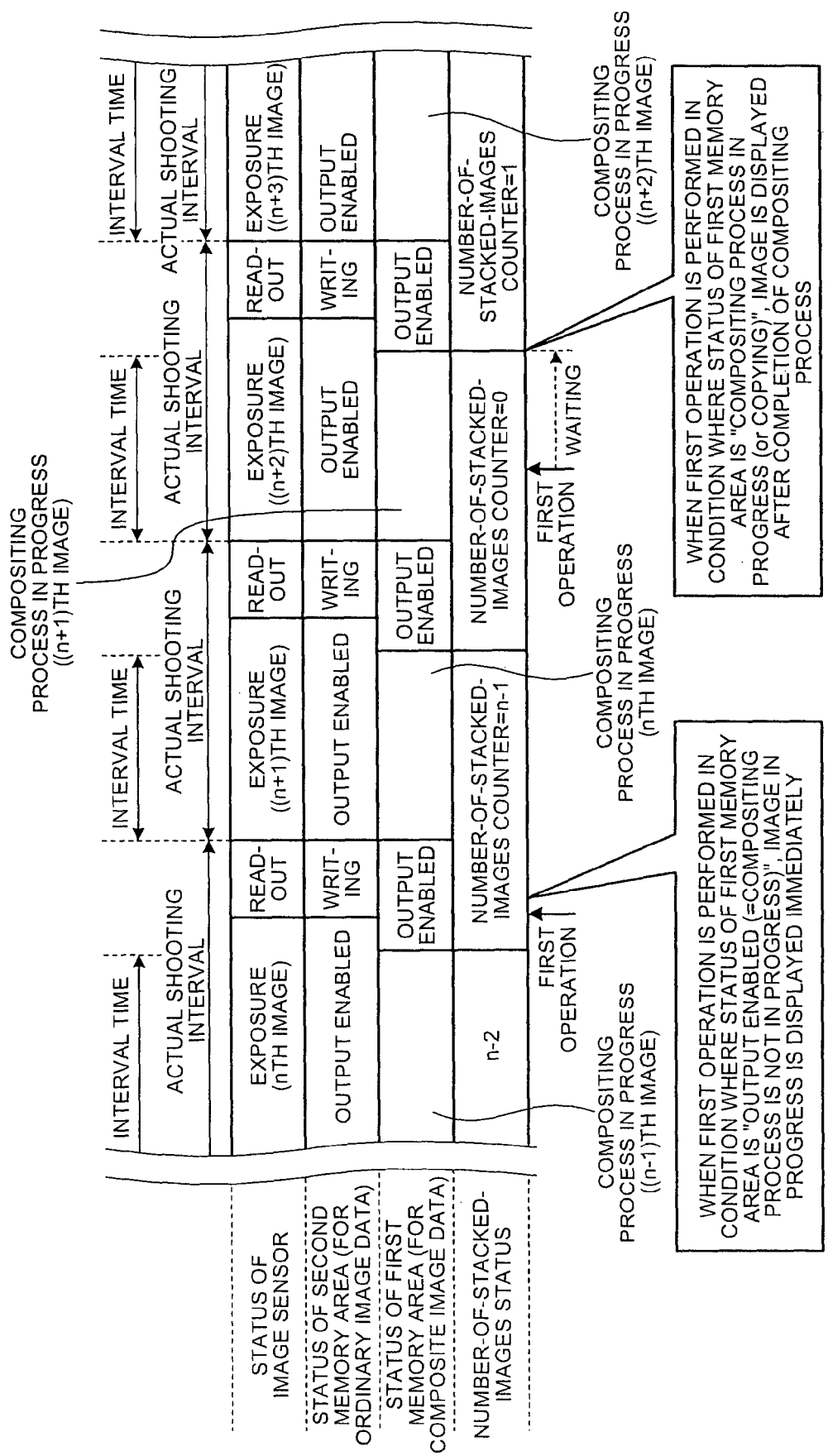
FIG. 13A is a timing diagram illustrating process states in a situation where a first operation is performed during a period when the interval composite shooting is performed.

FIGS. 13A to 13C are timing diagram each illustrating process states in a situation where the first operation (e.g., halfway-down pressing the release button 2) or the second operation (e.g., pressing the self-timer/delete switch 18) is performed during a period when the interval composite shooting is performed.

FIG. 13A is a timing diagram of a situation where the first operation (e.g., halfway-down pressing the release button 2) is performed during a period when the interval composite shooting is performed and the "image-in-progress-of-compositing displaying process" illustrated in FIG. 10 is performed without stopping the "interval shooting process". Referring to FIG. 13A, when the first operation is performed when the status of the first memory area is "OUTPUT ENABLED", the data stored in the first memory area, that is, a composite image in progress of the "lighten compositing process" as of this point in time, is immediately displayed on the LCD monitor 12. Referring to FIG. 13A, when the first operation is performed when the status of the first memory area is "COMPOSITING PROCESS IN PROGRESS", the displaying operation is put on wait until the compositing process is completed.

FIG. 13B is a timing diagram of a situation where the second operation (e.g., pressing the self-timer/delete switch 18) is performed when the status of the first memory area is "OUTPUT ENABLED" and the "compositing-buffer resetting process" illustrated in FIG. 11 is performed without stopping the "interval shooting process". When the second operation is performed in this situation, the number-of-stacked-images counter is reset immediately. However, referring to FIG. 13B, even when the first operation is performed in a period when copying of the first image after reset of the number-of-composited-images counter is not completed yet, the displaying operation is put on wait.

FIG. 13C is a timing diagram of a situation where the second operation (e.g., pressing the self-timer/delete switch 18) is performed when the status of the first memory area is "COMPOSITING PROCESS IN PROGRESS" and the "compositing-buffer resetting process" illustrated in FIG. 11 is performed without stopping the "interval shooting process". When the second operation is performed in this situation, a process of resetting the number-of-stacked-images counter is put on wait until the "lighten compositing process" ends. Furthermore, referring to FIG. 13C, even when the first operation is performed in a period when copying of the first image after reset the number-of-composited-images counter is not completed yet, the displaying operation is put on wait.

As described above by way of specific examples, the digital camera according to the present embodiment has the interval composite shooting function that performs the lighten compositing process while performing the interval shooting process. Accordingly, the digital camera can perform such operations as described below.

First, a composite image in progress can be displayed on the LCD monitor 12 while continuing the interval shooting process. Accordingly, a photographer can envision a finished image during shooting.

Furthermore, the lighten compositing process can be reset while continuing the interval shooting process. Furthermore, images obtained in lighten compositing processes performed until then can be stored. Accordingly, even when unnecessary light (light of a vehicle or a light trail of an airplane that unexpectedly enters a field of view) enters the field of view during shooting, the following can be achieved while continuing the shooting at a shooting site. That is, it becomes possible to obtain data from which a movie is to be produced later in which time continuity is maintained and such light is capitalized, and also to perform re-compositing to produce still images with light trails.

Furthermore, it is possible to obtain data, from which a movie is to be produced later, by performing shooting for as long as period possible and also to produce a plurality of still images containing light trails of a desired length that are visually checked by a user from the same data.

It is possible to perform selective use such that when free space of a storage medium such as the built-in memory 120 or the memory card 80 of the digital camera is small, only a result of compositing is recorded, while when the free space is sufficiently large, all data obtained by the interval shooting is recorded.

By performing shooting of a kind for capturing star trails, original data that allows easy production of a movie in which trails of stars gradually extend can be obtained. Power users are apt to perform fine adjustment on still images before producing movie data therefrom. The digital camera can satisfy such demands.

Even a user who is weak at postprocessing using a PC can produce a movie (what is called as a time-lapse movie) made up of frames captured over an extended period of time and appearing to be thinned to a short-time movie using only the digital camera.

Even a user who is weak at postprocessing using a PC can perform shooting of a kind for capturing star trails to produce a movie in which trails of stars gradually extend using only the digital camera.

A photographer can view not only a composite image stored in the first memory area but also grasp how many images are stacked to obtain the composite image while performing shooting easily.

It is also possible to avoid such a problem that during the series of interval compositing shooting operations, the AF function and the AE function react to a subject that has unexpectedly temporarily entered the field of view and undesirably change control values of only a part of a series of shot images, thereby undesirably making still images or a movie obtained by the lighten compositing process unnatural.

As described above, the interval composite shooting function that is characteristic of the digital camera according to the present embodiment is implemented by the program to be executed by the CPU block 1043, for example. The program for implementing the interval composite shooting function is provided as being installed in advance in the ROM 108 of the digital camera, for example. The program for implementing the interval composite shooting function may be provided as a file of an installable format or an executable format recorded in a computer-readable recording medium such as a CD-ROM, a flexible disk (FD), a CD-R, or a digital versatile disk (DVD). The program for implementing the interval composite shooting function may be configured to be stored in a computer connected to a network such as the Internet and provided by downloading via the network. The program for implementing the interval composite shooting function may be configured to be provided or distributed via a network such as the Internet.

The program for implementing the interval composite shooting function in the digital camera according to the present embodiment has a module structure that includes processing functions of the interval shooting section 51, the shooting-setting confirming section 52, the interval-image-file output section 53, the lighten compositing section 54, the composite-image-in-progress displaying section 55, and the compositing-buffer resetting section 56 described above. From a viewpoint of actual hardware, the CPU block 1043 reads out the program from the ROM 108 and executes the program to load the processing functions on a main memory (e.g., the SDRAM 103) so that the processing functions are set up on the main memory.

Specific embodiments of the present invention have been described above; however, the present invention is not limited to the embodiments described above, and can be modified in various manners without departing from the scope of the invention. In other words, the configurations and operations of the digital camera described above are merely specific examples, and can be modified in various manners depending on use and object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image capturing apparatus including an image sensor, a storage section, and a display section, the image capturing apparatus comprising:
    an interval shooting section that performs an interval shooting process that is a process that repeatedly performs exposure of and reading from the image sensor at predetermined intervals to capture a plurality of images one by one;
    a lighten compositing section that performs a lighten compositing process using a first image and a second image of the plurality of images captured by the interval shooting process one by one, the first image being an initial image among the plurality of images, the second image being captured subsequent to the first image, and stores a result of the lighten compositing process as a composite image in the storage section, and, as for each image of third and following images, the third image being captured subsequent to the second image, performs the lighten compositing process using the each image and the composite image stored in the storage section and stores a result of the lighten compositing process as a new composite image in the storage section; and
    a composite-image display section that, when a first operation is performed, causes the display section to display the composite image stored in the storage section without causing the interval shooting process to be stopped, wherein when the first operation is preformed during a period when the lighten compositing section is performing the lighten compositing process, the composite-image display section causes, after the lighten compositing process is completed and a new composite image is stored in the storage section, the display section to display the composite image stored in the storage section.

2. The image capturing apparatus according to claim 1, further comprising:
an image-file output section that, each time an image is captured by the interval shooting process, outputs the captured image in an image file form.

3. The image capturing apparatus according to claim 1, further comprising:
an image-file output section that, each time an image is captured by the interval shooting process, outputs a composite image as of this point in time stored in the storage section in an image file form.

4. The image capturing apparatus according to claim 1, further comprising:
a movie-file generating section that, each time an image is captured by the interval shooting process, generates a movie file that contains the captured image as one frame of a movie.

5. An image capturing apparatus including an image sensor, a storage section, and a display section, the image capturing apparatus comprising:
an interval shooting section that performs an interval shooting process that is a process that repeatedly performs exposure of and reading from the image sensor at predetermined intervals to capture a plurality of images one by one;
a lighten compositing section that performs a lighten compositing process using a first image and a second image of the plurality of images captured by the interval shooting process one by one, the first image being an initial image among the plurality of images, the second image being captured subsequent to the first image, and stores a result of the lighten compositing process as a composite image in the storage section, and, as for each image of third and following images, the third image being captured subsequent to the second image, performs the lighten compositing process using the each image and the composite image stored in the storage section and stores a result of the lighten compositing process as a new composite image in the storage section; and
a composite-image display section that, when a first operation is performed, causes the display section to display the composite image stored in the storage section without causing the interval shooting process to be stopped, wherein when a second operation is performed, the lighten compositing section performs the lighten compositing process without causing the interval shooting process to be stopped using a post-second-operation first image, the post-second-operation first image being an initial image captured by the interval shooting process after the second operation, and a post-second-operation second image, the post-second-operation second image being captured subsequent to the post-second-operation first image, and stores a result of the lighten compositing process as a composite image in the storage section, and, as for each image of images captured in succession to the post-second-operation second image, performs the lighten compositing process using the each image and the composite image stored in the storage section and stores a result of the lighten compositing process as a new composite image in the storage section.

6. The image capturing apparatus according to claim 5, wherein when the second operation is performed, the lighten compositing section resets the storage section, stores the post-second-operation first image in the storage section after the second operation has been performed, and thereafter performs the lighten compositing process using the stored image and the post-second-operation second image.

7. The image capturing apparatus according to claim 6, further comprising:
an image-file output section that, when the second operation is performed, outputs the composite image stored in the storage section in an image file form before the lighten compositing section resets the storage section.

8. An image capturing apparatus including an image sensor, a storage section, and a display section, the image capturing apparatus comprising:
an interval shooting section that performs an interval shooting process that is a process that repeatedly performs exposure of and reading from the image sensor at predetermined intervals to capture a plurality of images one by one;
a lighten compositing section that performs a lighten compositing process using a first image and a second image of the plurality of images captured by the interval shooting process one by one, the first image being an initial image among the plurality of images, the second image being captured subsequent to the first image, and stores a result of the lighten compositing process as a composite image in the storage section, and, as for each image of third and following images, the third image being captured subsequent to the second image, performs the lighten compositing process using the each image and the composite image stored in the storage section and stores a result of the lighten compositing process as a new composite image in the storage section;
a composite-image display section that, when a first operation is performed, causes the display section to display the composite image stored in the storage section without causing the interval shooting process to be stopped; and
a movie-file generating section that, each time an image is captured by the interval shooting process, generates a movie file that contains the composite image as of this point in time stored in the storage section as one frame of a movie.

9. An image capturing apparatus including an image sensor, a storage section, and a display section, the image capturing apparatus comprising:
an interval shooting section that performs an interval shooting process that is a process that repeatedly performs exposure of and reading from the image sensor at predetermined intervals to capture a plurality of images one by one;
a lighten compositing section that performs a lighten compositing process using a first image and a second image of the plurality of images captured by the interval shooting process one by one, the first image being an initial image among the plurality of images, the second image being captured subsequent to the first image, and stores a result of the lighten compositing process as a composite image in the storage section, and, as for each image of third and following images, the third image being captured subsequent to the second image, performs the lighten compositing process using the each image and the composite image stored in the storage section and stores a result of the lighten compositing process as a new composite image in the storage section; and a composite-image display section that, when a first operation is performed, causes the display section to display the composite image stored in the storage section without causing the interval shooting process to be stopped, wherein when setting is made so as to perform any one of an automatic focusing function and an automatic exposure control function, the interval shooting section performs corresponding one of automatic focusing and automatic exposure control when the interval shooting section captures the first image, and uses a result of the corresponding one of automatic focusing and automatic exposure control obtained when capturing the first image when the interval shooting section captures each image of the second and following images.

10. An image capturing method, comprising:

performing an interval shooting process is a process that repeatedly performs exposure of and reading from an image sensor at predetermined intervals to capture a plurality of images;

performing a lighten compositing process using a first image and a second image of the plurality of images captured by the interval shooting process, the first image being an initial image among the plurality of images, the second image being captured subsequent to the first image, and storing a result of the lighten compositing process as a composite image in a memory, and, as for each image of third and following images, the third image being captured subsequent to the second image, performs the lighten compositing process using the each image and the composite image stored in the storage section and stores a result of the lighten compositing process as a new composite image in the storage section; and displaying the composite image stored in the storage section without causing the interval shooting process to be stopped, when a first operation is performed, wherein when the first operation is performed during a period when the lighten compositing process is being performed, the composite-image display section causes the display to display the composite image stored in the storage section, after the lighten compositing process is completed and a new composite image is stored.

* * * * *